US012809322B2

(12) United States Patent
Malladi et al.

(10) Patent No.: US 12,809,322 B2
(45) Date of Patent: Nov. 24, 2026

(54) BUILDING MANAGEMENT SYSTEM WITH BUILDING DOMAIN SYSTEM COORDINATION USING ARTIFICIAL INTELLIGENCE

(71) Applicant: Tyco Fire & Security GmbH, Neuhausen am Rheinfall (CH)

(72) Inventors: Sastry KM Malladi, Fremont, CA (US); Gregory A. Makowski, Los Altos, CA (US); Trent M. Swanson, Wellington, FL (US); Miguel Galvez, Westford, MA (US); Vineet Binodshanker Sinha, Brookfield, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 322 days.

(21) Appl. No.: 18/670,585

(22) Filed: May 21, 2024

(65) Prior Publication Data

US 2024/0393750 A1 Nov. 28, 2024

Related U.S. Application Data

(60) Provisional application No. 63/469,325, filed on May 26, 2023.

(51) Int. Cl.
*G05B 13/02* (2006.01)
*F24F 11/38* (2018.01)
*F24F 11/64* (2018.01)

(52) U.S. Cl.
CPC .......... *G05B 13/0265* (2013.01); *F24F 11/38* (2018.01); *F24F 11/64* (2018.01)

(58) Field of Classification Search
CPC . F24F 11/38; F24F 11/64; F24F 11/62; G05B 13/0265; G05B 15/02; G05B 2219/2642; G06N 3/006; G06N 3/044; G06N 3/08
USPC .......................................................... 700/276
See application file for complete search history.

(56) References Cited

U.S. PATENT DOCUMENTS 11,394,576 B2 7/2022 Ray et al.
2012/0022700 A1* 1/2012 Drees .................... G05B 15/02 705/412
2014/0179222 A1* 6/2014 Chaudhary .............. H04B 5/20 455/41.1
2019/0199548 A1 6/2019 Ray et al.
(Continued)

OTHER PUBLICATIONS

U.S. Appl. No. 18/438,195, filed Feb. 9, 2024, Lu et al.

*Primary Examiner* — Chun Cao
(74) *Attorney, Agent, or Firm* — Foley & Lardner LLP

(57) ABSTRACT

A method of operating a building includes recommending, by one or more processors, an action for the building responsive to a user query, predicting, by the one or more processors, a plurality of entities affected by the action. The plurality of entities are associated with a plurality of separate domain systems and the plurality of separate domain systems use a plurality of different data formats. The method also includes generating, by the one or more processors using at least one generative AI model, a plurality of control outputs in the plurality of different data formats and affecting operations of the plurality of separate domain systems by providing the plurality of control outputs in the plurality of different data formats to the plurality of separate domain systems.

20 Claims, 10 Drawing Sheets

(56) References Cited

U.S. PATENT DOCUMENTS

| | | | |
|---|---|---|---|
| 2020/0366517 | A1* | 11/2020 | Ray ..................... H04L 12/2816 |
| 2021/0200807 | A1 | 7/2021 | Ploegert et al. |
| 2021/0381861 | A1* | 12/2021 | Brown ..................... F24F 11/49 |
| 2021/0382449 | A1* | 12/2021 | Krishnan ........... G05B 19/0423 |
| 2022/0237063 | A1* | 7/2022 | Giddings .............. G06F 11/079 |
| 2023/0145448 | A1* | 5/2023 | Huber .................. G05B 23/024 700/275 |
| 2023/0169220 | A1 | 6/2023 | Ramanasankaran et al. |
| 2023/0185983 | A1 | 6/2023 | Ramanasankaran et al. |
| 2023/0213909 | A1 | 7/2023 | Galvez et al. |
| 2023/0237060 | A1* | 7/2023 | Patton ............... G06F 16/24575 |
| 2023/0245651 | A1* | 8/2023 | Wang ...................... G06F 3/011 704/275 |
| 2024/0036537 | A1 | 2/2024 | Gupta et al. |
| 2024/0103960 | A1* | 3/2024 | Cook .................. G06F 11/0793 |
| 2024/0126227 | A1 | 4/2024 | Kammela et al. |

* cited by examiner

BUILDING MANAGEMENT SYSTEM WITH BUILDING DOMAIN SYSTEM COORDINATION USING ARTIFICIAL INTELLIGENCE

CROSS-REFERENCE TO RELATED APPLICATIONS

This application claims priority to and the benefit of U.S. Provisional Patent Application No. 63/469,325, filed May 26, 2023, the entire disclosure of which is incorporated by reference herein.

BACKGROUND

This application relates generally to a building system of a building. This application relates more particularly to systems for managing and processing data of the building system.

Various interactions between building systems, components of building systems, users, technicians, and/or devices managed by users or technicians can rely on timely generation and presentation of data relating to the interactions, including for performing service operations. However, it can be difficult to generate the data elements to precisely identify proper response actions or sequences of response actions, as well as options for modified response actions, depending on various factors associated with items of equipment to be serviced, technical issues with the items of equipment, and the availability of timely, precise data to use for supporting the service operations.

Furthermore, buildings are typically served by a variety of distinct domain systems, such as HVAC systems, lighting systems, access control systems, security systems, elevator systems, fire protection systems, energy systems, work order systems, and systems relating to type/purpose of the building (e.g., a healthcare system such as a medical device system, nurse call system, patient monitoring system, etc. for a hospital or clinic; a manufacturing system such as a smart manufacturing management system for a factory; an inventory system for a warehouse or retail facility; a room reservation system for an office facility; a server management system for a data center; etc.). Such domain systems are often siloed without interoperability therebetween, may be managed by different vendors, and can use different data formats, communication protocols, software programming, etc. which makes integration of different domain systems challenging using conventional techniques. Accordingly, human building managers are often left with a challenging task of interacting separately with numerous domain systems in siloed and disjointed manner.

SUMMARY

One or more aspects relate to a method of operating a building. The method includes recommending, by one or more processors, an action for the building responsive to a user query and predicting, by the one or more processors, a plurality of entities affected by the action. The plurality of entities are associated with a plurality of separate domain systems that use a plurality of different data formats. The method also includes generating, by the one or more processors using at least one generative AI model, a plurality of control outputs in the plurality of different data formats and affecting operations of the plurality of separate domain systems by providing the plurality of control outputs in the plurality of different data formats to the plurality of separate domain systems.

In some embodiments, the user query is provided as a freeform textual or audio input. The plurality of separate domain systems can include two or more of an HVAC system, a work order system, a room reservation system, an access control system, a security system, a fire system, a medical device system, an energy system, a building management system, a lighting system, an elevator system, a manufacturing system, an inventory system, and a parking system.

In some embodiments, the method also includes augmenting the at least one generative AI model using training data relating to the plurality of separate domain systems.

In some embodiments, predicting the plurality of entities affected by the action includes generating an indication of the plurality of entities using the at least one generative AI model.

In some embodiments, the user query relates to performance of a unit of HVAC equipment, the action comprises a maintenance task for the unit of HVAC equipment, and the plurality of control outputs include an instruction for a work order to be generated by a work order system of the plurality of domain system, a prompt to a room reservation system of the plurality of domain systems, the prompt causing the room reservation system to change reservations for a space to be affected by performance of the maintenance task, and a control decision for an HVAC system of the plurality of domain systems, the control decision configured to prepare the unit of HVAC equipment for maintenance or to cause the HVAC system to compensate for effects of the performance of the maintenance task on building conditions.

In some embodiments, the user query relates to an incoming patient to a hospital, the action comprises readying a room for patient treatment, and the plurality of control outputs include a control signal for an HVAC system of the plurality of domain systems where the controls signal causes the HVAC system to place the room in compliance with temperature, humidity, and pressure requirements for patient treatment, a prompt to a room reservation system of the plurality of domain systems where the prompt causes the room reservation to mark the room as in-use for the patient treatment and an instruction to at a healthcare system of the plurality of domain systems. The instruction causes the healthcare system to perform one or more of notifying a healthcare provider of the room for the patient treatment, initiating operation of a medical device for use in the patient treatment, or updating an electronic medical record for the patient.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
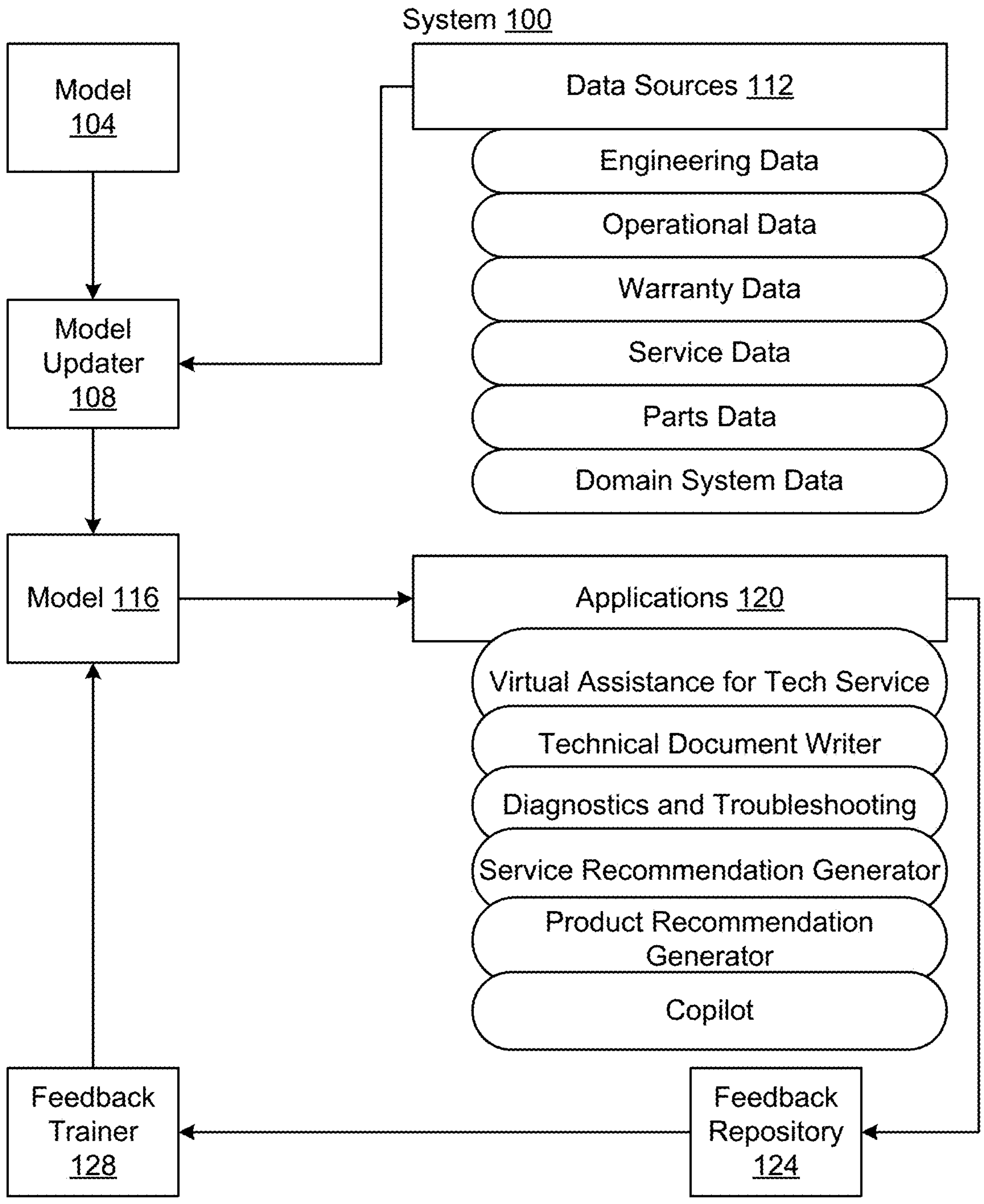
FIG. 1 is a block diagram of an example of a machine learning model-based system for equipment servicing applications.

Referring generally to the FIGURES, systems and methods in accordance with the present disclosure can implement various systems to precisely generate data relating to operations to be performed for managing building systems and components and/or items of equipment, including heating, ventilation, cooling, and/or refrigeration (HVAC-R) systems and components. For example, various systems described herein can be implemented to more precisely generate data for various applications including, for example and without limitation, virtual assistance for supporting technicians responding to service requests; generating technical reports corresponding to service requests; facilitating diagnostics and troubleshooting procedures; recommendations of services to be performed; and/or recommendations for products or tools to use or install as part of service operations. Various such applications can facilitate both asynchronous and real-time service operations, including by generating text data for such applications based on data from disparate data sources that may not have predefined database associations amongst the data sources, yet may be relevant at specific steps or points in time during service operations.

In some systems, service operations can be supported by text information, such as predefined text documents such as service, diagnostic, and/or troubleshooting guides. Various such text information may not be useful for specific service requests and/or technicians performing the service. For example, the text information may correspond to different items of equipment or versions of items of equipment to be serviced. The text information, being predefined, may not account for specific technical issues that may be present in the items of equipment to be serviced.

AI and/or machine learning (ML) systems, including but not limited to LLMs, can be used to generate text data and data of other modalities in a more responsive manner to real-time conditions, including generating strings of text data that may not be provided in the same manner in existing documents, yet may still meet criteria for useful text information, such as relevance, style, and coherence. For example, LLMs can predict text data based at least on inputted prompts and by being configured (e.g., trained, modified, updated, fine-tuned) according to training data representative of the text data to predict or otherwise generate.

However, various considerations may limit the ability of such systems to precisely generate appropriate data for specific conditions. For example, due to the predictive nature of the generated data, some LLMs may generate text data that is incorrect, imprecise, or not relevant to the specific conditions. Using the LLMs may require a user to manually vary the content and/or syntax of inputs provided to the LLMs (e.g., vary inputted prompts) until the output of the LLMs meets various objective or subjective criteria of the user. The LLMs can have token limits for sizes of inputted text during training and/or runtime/inference operations (and relaxing or increasing such limits may require increased computational processing, API calls to LLM services, and/or memory usage), limiting the ability of the LLMs to be effectively configured or operated using large amounts of raw data or otherwise unstructured data.

Systems and methods in accordance with the present disclosure can use machine learning models, including LLMs and other generative AI systems, to capture data, including but not limited to unstructured knowledge from various data sources, and process the data to accurately generate outputs, such as completions responsive to prompts, including in structured data formats for various applications and use cases. The system can implement various automated and/or expert-based thresholds and data quality management processes to improve the accuracy and quality of generated outputs and update training of the machine learning models accordingly. The system can enable real-time messaging and/or conversational interfaces for users to provide field data regarding equipment to the system (including presenting targeted queries to users that are expected to elicit relevant responses for efficiently receiving useful response information from users) and guide users, such as service technicians, through relevant service, diagnostic, troubleshooting, and/or repair processes.

This can include, for example, receiving data from technician service reports in various formats, including various modalities and/or multi-modal formats (e.g., text, speech, audio, image, and/or video). The system can facilitate automated, flexible customer report generation, such as by processing information received from service technicians and other users into a standardized format, which can reduce the constraints on how the user submits data while improving resulting reports. The system can couple unstructured service data to other input/output data sources and analytics, such as to relate unstructured data with outputs of timeseries data from equipment (e.g., sensor data; report logs) and/or outputs from models or algorithms of equipment operation, which can facilitate more accurate analytics, prediction services, diagnostics, and/or fault detection. The system can perform classification or other pattern recognition or trend detection operations to facilitate more timely assignment of technicians, scheduling of technicians based on expected times for jobs, and provisioning of trucks, tools, and/or parts. The system can perform root cause prediction by being trained using data that includes indications of root causes of faults or errors, where the indications are labels for or otherwise associated with (unstructured or structure) data such as service requests, service reports, service calls, etc. The system can receive, from a service technician in the field evaluating the issue with the equipment, feedback regarding the accuracy of the root cause predictions, as well as feedback regarding how the service technician evaluated information about the equipment (e.g., what data did they evaluate; what did they inspect; did the root cause prediction or instructions for finding the root cause accurately match the type of equipment, etc.), which can be used to update the root cause prediction model.

For example, the system can provide a platform for fault detection and servicing processes in which a machine learning model is configured based on connecting or relating unstructured data and/or semantic data, such as human feedback and written/spoken reports, with time-series product data regarding items of equipment, so that the machine learning model can more accurately detect causes of alarms or other events that may trigger service responses. For instance, responsive to an alarm for a chiller, the system can more accurately detect a cause of the alarm, and generate a prescription (e.g., for a service technician) for responding to the alarm; the system can request feedback from the service technician regarding the prescription, such as whether the prescription correctly identified the cause of the alarm and/or actions to perform to respond to the cause, as well as the information that the service technician used to evaluate the correctness or accuracy of the prescription; the system can use this feedback to modify the machine learning models, which can increase the accuracy of the machine learning models.

In some instances, significant computational resources (or human user resources) can be required to process data relating to equipment operation, such as time-series product data and/or sensor data, to detect or predict faults and/or causes of faults. In addition, it can be resource-intensive to label such data with identifiers of faults or causes of faults, which can make it difficult to generate machine learning training data from such data. Systems and methods in accordance with the present disclosure can leverage the efficiency of language models (e.g., GPT-based models or other pre-trained LLMs) in extracting semantic information (e.g., semantic information identifying faults, causes of faults, and other accurate expert knowledge regarding equipment servicing) from the unstructured data in order to use both the unstructured data and the data relating to equipment operation to generate more accurate outputs regarding equipment servicing. As such, by implementing language models using various operations and processes described herein, building management and equipment servicing systems can take advantage of the causal/semantic associations between the unstructured data and the data relating to equipment operation, and the language models can allow these systems to more efficiently extract these relationships in order to more accurately predict targeted, useful information for servicing applications at inference-time/runtime. While various implementations are described as being implemented using generative AI models such as transformers and/or GANs, in some embodiments, various features described herein can be implemented using non-generative AI models or even without using AI/machine learning, and all such modifications fall within the scope of the present disclosure.

The system can enable a generative AI-based service wizard interface. For example, the interface can include user interface and/or user experience features configured to provide a question/answer-based input/output format, such as a conversational interface, that directs users through providing targeted information for accurately generating predictions of root cause, presenting solutions, or presenting instructions for repairing or inspecting the equipment to identify information that the system can use to detect root causes or other issues. The system can use the interface to present information regarding parts and/or tools to service the equipment, as well as instructions for how to use the parts and/or tools to service the equipment.

In various implementations, the systems can include a plurality of machine learning models that may be configured using integrated or disparate data sources. This can facilitate more integrated user experiences or more specialized (and/or lower computational usage for) data processing and output generation. Outputs from one or more first systems, such as one or more first algorithms or machine learning models, can be provided at least as part of inputs to one or more second systems, such as one or more second algorithms or machine learning models. For example, a first language model can be configured to process unstructured inputs (e.g., text, speech, images, etc.) into a structure output format compatible for use by a second system, such as a root cause prediction algorithm or equipment configuration model.

The system can be used to automate interventions for equipment operation, servicing, fault detection and diagnostics (FDD), and alerting operations. For example, by being configured to perform operations such as root cause prediction, the system can monitor data regarding equipment to predict events associated with faults and trigger responses such as alerts, service scheduling, and initiating FDD or modifications to configuration of the equipment. The system can present to a technician or manager of the equipment a report regarding the intervention (e.g., action taken responsive to predicting a fault or root cause condition) and requesting feedback regarding the accuracy of the intervention, which can be used to update the machine learning models to more accurately generate interventions.

The system can also or alternatively provide a copilot for a building manager, facilitating a building manager in controlling multiple domain systems for a building. Various domain systems are described in U.S. Pat. No. 11,394,576 granted Jul. 19, 2022, the entire disclosure of which is incorporated by reference herein. The domain systems can include building management systems, HVAC systems, lighting systems, access control systems, ticketing systems (e.g., for stadiums, theaters, etc.), security systems, elevator systems, escalator systems, fire protection systems, energy systems (e.g., metering and management systems, on-site power generation systems such as solar energy systems, geothermal systems, wind power systems, microreactors, fossil-fuel-based generators, etc.), work order systems (e g, maintenance systems), and systems relating to type/purpose of the building (e.g., a healthcare system such as a medical device system, nurse call system, patient monitoring system, electronic medical records system, etc. for a hospital or clinic; a manufacturing system such as a smart manufacturing management system for a factory; an inventory system for a warehouse or retail facility; a room reservation system for an office facility; a server management system for a data center; connected kitchen equipment for a restaurant, etc.).

IV. Machine Learning Models for Building Management and Equipment Servicing

FIG. 1 depicts an example of a system 100. The system 100 can implement various operations for configuring (e.g., training, updating, modifying, transfer learning, fine-tuning, etc.) and/or operating various AI and/or ML systems, such as neural networks of LLMs or other generative AI systems. The system 100 can be used to implement various generative AI-based building equipment servicing operations.

For example, the system 100 can be implemented for operations associated with any of a variety of building management systems (BMSs) or equipment or components thereof. A BMS can include a system of devices that can control, monitor, and manage equipment in or around a building or building area. The BMS can include, for example, a HVAC system, a security system, a lighting system, a fire alerting system, any other system that is capable of managing building functions or devices, or any combination thereof. The BMS can include or be coupled with items of equipment, for example and without limitation, such as heaters, chillers, boilers, air handling units, sensors, actuators, refrigeration systems, fans, blowers, heat exchangers, energy storage devices, condensers, valves, or various combinations thereof.

The items of equipment can operate in accordance with various qualitative and quantitative parameters, variables, setpoints, and/or thresholds or other criteria, for example. In some instances, the system 100 and/or the items of equipment can include or be coupled with one or more controllers for controlling parameters of the items of equipment, such as to receive control commands for controlling operation of the items of equipment via one or more wired, wireless, and/or user interfaces of controller.

Various components of the system 100 or portions thereof can be implemented by one or more processors coupled with or more memory devices (memory). The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors can be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources.

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

Machine Learning Models

The system 100 can include or be coupled with one or more first models 104. The first model 104 can include one or more neural networks, including neural networks configured as generative models. For example, the first model 104 can predict or generate new data (e.g., artificial data; synthetic data; data not explicitly represented in data used for configuring the first model 104). The first model 104 can generate any of a variety of modalities of data, such as text, speech, audio, images, and/or video data. The neural network can include a plurality of nodes, which may be arranged in layers for providing outputs of one or more nodes of one layer as inputs to one or more nodes of another layer. The neural network can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first model 104 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, the first model 104 can include at least one GPT model. The GPT model can receive an input sequence, and can parse the input sequence to determine a sequence of tokens (e.g., words or other semantic units of the input sequence, such as by using Byte Pair Encoding tokenization). The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the token tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer based operations or networks to the modified input sequence to identify relationships between tokens for detecting the next token to form the output sequence.

The first model 104 can include at least one diffusion model, which can be used to generate image and/or video data. For example, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first model 104 includes a plurality of generative models, such as GPT and diffusion models, that can be trained separately or jointly to facilitate generating multi-modal outputs, such as technical documents (e.g., service guides) that include both text and image/video information.

In some implementations, the first model 104 can be configured using various unsupervised and/or supervised training operations. The first model 104 can be configured using training data from various domain-agnostic and/or domain-specific data sources, including but not limited to various forms of text, speech, audio, image, and/or video data, or various combinations thereof. The training data can include a plurality of training data elements (e.g., training data instances). Each training data element can be arranged in structured or unstructured formats; for example, the training data element can include an example output mapped to an example input, such as a query representing a service request or one or more portions of a service request, and a response representing data provided responsive to the query. The training data can include data that is not separated into input and output subsets (e.g., for configuring the first model 104 to perform clustering, classification, or other unsupervised ML operations). The training data can include human-labeled information, including but not limited to feedback regarding outputs of the models 104, 116. This can allow the system 100 to generate more human-like outputs.

In some implementations, the training data includes data relating to building management systems. For example, the training data can include examples of HVAC-R data, such as operating manuals, technical data sheets, configuration settings, operating setpoints, diagnostic guides, troubleshooting guides, user reports, technician reports. In some implementations, the training data used to configure the first model 104 includes at least some publicly accessible data, such as data retrievable via the Internet.

Referring further to FIG. 1, the system 100 can configure the first model 104 to determine one or more second models 116. For example, the system 100 can include a model updater 108 that configures (e.g., trains, updates, modifies, fine-tunes, etc.) the first model 104 to determine the one or more second models 116. In some implementations, the second model 116 can be used to provide application-specific outputs, such as outputs having greater precision, accuracy, or other metrics, relative to the first model, for targeted applications.

The second model 116 can be similar to the first model 104. For example, the second model 116 can have a similar or identical backbone or neural network architecture as the first model 104. In some implementations, the first model 104 and the second model 116 each include generative AI machine learning models, such as LLMs (e.g., GPT-based LLMs) and/or diffusion models. The second model 116 can be configured using processes analogous to those described for configuring the first model 104.

In some implementations, the model updater 108 can perform operations on at least one of the first model 104 or the second model 116 via one or more interfaces, such as application programming interfaces (APIs). For example, the models 104, 116 can be operated and maintained by one or more systems separate from the system 100. The model updater 108 can provide training data to the first model 104, via the API, to determine the second model 116 based on the first model 104 and the training data. The model updater 108 can control various training parameters or hyperparameters (e.g., learning rates, etc.) by providing instructions via the API to manage configuring the second model 116 using the first model 104.

Data Sources

The model updater 108 can determine the second model 116 using data from one or more data sources 112. For example, the system 100 can determine the second model 116 by modifying the first model 104 using data from the one or more data sources 112. The data sources 112 can include or be coupled with any of a variety of integrated or disparate databases, data warehouses, digital twin data structures (e.g., digital twins of items of equipment or building management systems or portions thereof), data lakes, data repositories, documentation records, or various combinations thereof. In some implementations, the data sources 112 include HVAC-R data in any of text, speech, audio, image, or video data, or various combinations thereof, such as data associated with HVAC-R components and procedures including but not limited to installation, operation, configuration, repair, servicing, diagnostics, and/or troubleshooting of HVAC-R components and systems. Various data described below with reference to data sources 112 may be provided in the same or different data elements, and may be updated at various points. The data sources 112 can include or be coupled with items of equipment (e.g., where the items of equipment output data for the data sources 112, such as sensor data, etc.). The data sources 112 can include various online and/or social media sources, such as blog posts or data submitted to applications maintained by entities that manage the buildings. The system 100 can determine relations between data from different sources, such as by using timeseries information and identifiers of the sites or buildings at which items of equipment are present to detect relationships between various different data relating to the items of equipment (e.g., to train the models 104, 116 using both timeseries data (e.g., sensor data; outputs of algorithms or models, etc.) regarding a given item of equipment and freeform natural language reports regarding the given item of equipment).

The data sources 112 can include unstructured data or structured data (e.g., data that is labeled with or assigned to one or more predetermined fields or identifiers). For example, using the first model 104 and/or second model 116 to process the data can allow the system 100 to extract useful information from data in a variety of formats, including unstructured/freeform formats, which can allow service technicians to input information in less burdensome formats. The data can be of any of a plurality of formats (e.g., text, speech, audio, image, video, etc.15ervice multi-modal formats. For example, the data may be received from service technicians in forms such as text (e.g., laptop/desktop or mobile application text entry), audio, and/or video (e.g., dictating findings while capturing video).

The data sources 112 can include engineering data regarding one or more items of equipment. The engineering data can include manuals, such as installation manuals, instruction manuals, or operating procedure guides. The engineering data can include specifications or other information regarding operation of items of equipment. The engineering data can include engineering drawings, process flow diagrams, refrigeration cycle parameters (e.g., temperatures, pressures), or various other information relating to structures and functions of items of equipment. The equipment can be associated a variety of different domains associated with a building, for example HVAC equipment, lighting equipment, security equipment, access control equipment, fire protection and alerting equipment, and/or various equipment used in different types of building (e.g., medical devices in healthcare facilities, manufacturing equipment, data center computing equipment, audio-visual equipment in offices and schools, kitchen equipment in food service facilities, etc.).

In some implementations, the data sources 112 can include operational data regarding one or more items of equipment. The operational data can represent detected information regarding items of equipment, such as meter data, sensor data, logged data, user reports, or technician reports. The operational data can include, for example, service tickets generated responsive to requests for service, work orders, data from digital twin data structures maintained by an entity of the item of equipment, outputs or other information from equipment operation models (e.g., chiller vibration models), equipment settings, or various combinations thereof. Logged data, user reports, service tickets, billing records, time sheets, and various other such data can provide temporal information, such as how long service operations may take, or durations of time between service operations, which can allow the system 100 to predict resources to use for performing service as well as when to request service. Such data can also allow the system 100 to identify and diagnose performance issues with equipment, determine interrelationships between equipment, predict effects of different actions on various different domains and equipment, etc.

The data sources 112 can include, for instance, warranty data. The warranty data can include warranty documents or agreements that indicate conditions under which various entities associated with items of equipment are to provide service, repair, or other actions corresponding to items of equipment, such as actions corresponding to service requests. The warranty data can be associated with different domain systems and can different service providers, in some embodiments.

The data sources 112 can include service data. The service data can include data from any of various service providers, such as service reports. The service data can indicate service procedures performed, including associated service procedures with initial service requests and/or sensor data related conditions to trigger service and/or sensor data measured during service processes. The service data can be related to service on different domain systems, for example by different service providers and with service reports in multiple different formats.

In some implementations, the data sources 112 can include parts data, including but not limited to parts usage and sales data. For example, the data sources 112 can indicate various parts associated with installation or repair of items of equipment. The data sources 112 can indicate tools for performing service and/or installing parts. The parts can be associated with multiple different domain systems, for example parts for HVAC equipment, parts for lighting equipment, parts for an elevator system, etc.

In some implementations, the data sources 112 can include domain system data. Domain system data can include data relating to the configuration, operation, activation, scope, etc. of various domain systems. For example, the domain system data can identify the domain systems present at a building, data formats (e.g., protocols, data objects, templates, input requirements, output formats, etc.) used by the domain systems, information relating to application programming interfaces (APIs) used by the domain systems, etc. Domain system data can include logged data of actions taken in different domain systems, for example in a manner such that the data sources 112 can reflect actions taken concurrently in multiple domain systems such that the system 100 can extract information relating to correlation between operations of the domain systems. Domain system data can include data in a variety of different formats and relating to various types of information depending on the particular different domain systems included.

The system 100 can include, with the data of the data sources 112, labels to facilitate cross-reference between items of data that may relate to common items of equipment, sites, service technicians, customers, or various combinations thereof. For example, data from disparate sources may be labeled with time data, which can allow the system 100 (e.g., by configuring the models 104, 116) to increase a likelihood of associating information from the disparate sources due to the information being detected or recorded (e.g., as service reports, as actions in a domain system) at the same time or near in time.

For example, the data sources 112 can include data that can be particular to specific or similar items of equipment, buildings, equipment configurations, environmental states, or various combinations thereof. In some implementations, the data includes labels or identifiers of such information, such as to indicate locations, weather conditions, timing information, uses of the items of equipment or the buildings or sites at which the items of equipment are present, etc. This can enable the models 104, 116 to detect patterns of usage (e.g., spikes; troughs; seasonal or other temporal patterns) or other information that may be useful for determining causes of issues or causes of service requests, or predict future issues, such as to allow the models 104, 116 to be trained using information indicative of causes of issues across multiple items of equipment (which may have the same or similar causes even if the data regarding the items of equipment is not identical). For example, an item of equipment may be at a site that is a museum; by relating site usage or occupancy data with data regarding the item of equipment, such as sensor data and service reports, the system 100 can configure the models 104, 116 to determine a high likelihood of issues occurring before events associated with high usage (e.g., gala, major exhibit opening), and can generate recommendations to perform diagnostics or servicing prior to the events.

Model Configuration

Referring further to FIG. 1, the model updater 108 can perform various machine learning model configuration/training operations to determine the second models 116 using the data from the data sources 112. For example, the model updater 108 can perform various updating, optimization, retraining, reconfiguration, fine-tuning, or transfer learning operations, or various combinations thereof, to determine the second models 116. The model updater 108 can configure the second models 116, using the data sources 112, to generate outputs (e.g., completions) in response to receiving inputs (e.g., prompts), where the inputs and outputs can be analogous to data of the data sources 112.

For example, the model updater 108 can identify one or more parameters (e.g., weights and/or biases) of one or more layers of the first model 104, and maintain (e.g., freeze, maintain as the identified values while updating) the values of the one or more parameters of the one or more layers. In some implementations, the model updater 108 can modify the one or more layers, such as to add, remove, or change an output layer of the one or more layers, or to not maintain the values of the one or more parameters. The model updater 108 can select at least a subset of the identified one or parameters to maintain according to various criteria, such as user input or other instructions indicative of an extent to which the first model 104 is to be modified to determine the second model 116. In some implementations, the model updater 108 can modify the first model 104 so that an output layer of the first model 104 corresponds to output to be determined for applications 120.

Responsive to selecting the one or more parameters to maintain, the model updater 108 can apply, as input to the second model 116 (e.g., to a candidate second model 116, such as the modified first model 104, such as the first model 104 having the identified parameters maintained as the identified values), training data from the data sources 112. For example, the model updater 108 can apply the training data as input to the second model 116 to cause the second model 116 to generate one or more candidate outputs.

The model updater 108 can evaluate a convergence condition to modify the candidate second model 116 based at least on the one or more candidate outputs and the training data applied as input to the candidate second model 116. For example, the model updater 108 can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second model 116 correspond to the ground truth represented by the training data. The model updater 108 can use any of a variety of optimization algorithms (e.g., gradient descent, stochastic descent, Adam optimization, etc.) to modify one or more parameters (e.g., weights or biases of the layer(s) of the candidate second model 116 that are not frozen) of the candidate second model 116 according to the evaluation of the objective function. In some implementations, the model updater 108 can use various hyperparameters to evaluate the convergence condition and/or perform the configuration of the candidate second model 116 to determine the second model 116, including but not limited to hyperparameters such as learning rates, numbers of iterations or epochs of training, etc.

As described further herein with respect to applications 120, in some implementations, the model updater 108 can select the training data from the data of the data sources 112 to apply as the input based at least on a particular application of the plurality of applications 120 for which the second model 116 is to be used for. For example, the model updater 108 can select data from the parts data source 112 for the product recommendation generator application 120, or select various combinations of data from the data sources 112 (e.g., engineering data, operational data, and service data) for the service recommendation generator application 120. The model updater 108 can apply various combinations of data from various data sources 112 to facilitate configuring the second model 116 for one or more applications 120.

In some implementations, the system 100 can perform at least one of conditioning, classifier-based guidance, or classifier-free guidance to configure the second model 116 using the data from the data sources 112. For example, the system 100 can use classifiers associated with the data, such as identifiers of the item of equipment, a type of the item of equipment, a type of entity operating the item of equipment, a site at which the item of equipment is provided, or a history of issues at the site, to condition the training of the second model 116. For example, the system 100 combine (e.g., concatenate) various such classifiers with the data for inputting to the second model 116 during training, for at least a subset of the data used to configure the second model 116, which can enable the second model 116 to be responsive to analogous information for runtime/inference time operations.

Applications

Referring further to FIG. 1, the system 100 can use outputs of the one or more second models 116 to implement one or more applications 120. For example, the second models 116, having been configured using data from the data sources 112, can be capable of precisely generating outputs that represent useful, timely, and/or real-time information for the applications 120. In some implementations, each application 120 is coupled with a corresponding second model 116 that is specifically configured to generate outputs for use by the application 120. Various applications 120 can be coupled with one another, such as to provide outputs from a first application 120 as inputs or portions of inputs to a second application 120.

The applications 120 can include any of a variety of desktop, web-based/browser-based, or mobile applications. For example, the applications 120 can be implemented by enterprise management software systems, employee or other user applications (e.g., applications that relate to BMS functionality such as temperature control, user preferences, conference room scheduling, etc.), equipment portals that provide data regarding items of equipment, or various combinations thereof. The applications 120 can include user interfaces, wizards, checklists, conversational interfaces, chatbots, configuration tools, or various combinations thereof. The applications 120 can receive an input, such as a prompt (e.g., from a user), provide the prompt to the second model 116 to cause the second model 116 to generate an output, such as a completion in response to the prompt, and present an indication of the output. The applications 120 can receive inputs and/or present outputs in any of a variety of presentation modalities, such as text, speech, audio, image, and/or video modalities. For example, the applications 120 can receive unstructured or freeform inputs from a user, such as a service technician, and generate reports in a standardized format, such as a customer-specific format. This can allow, for example, technicians to automatically, and flexibly, generate customer-ready reports after service visits without requiring strict input by the technician or manually sitting down and writing reports; to receive inputs as dictations in order to generate reports; to receive inputs in any form or a variety of forms, and use the second model 116 (which can be trained to cross-reference metadata in different portions of inputs and relate together data elements) to generate output reports (e.g., the second model 116, having been configured with data that includes time information, can use timestamps of input from dictation and timestamps of when an image is taken, and place the image in the report in a target position or label based on time correlation).

In some implementations, the applications 120 include at least one virtual assistant (e.g., virtual assistance for technician services) application 120. The virtual assistant application can provide various services to support technician operations, such as presenting information from service requests, receiving queries regarding actions to perform to service items of equipment, and presenting responses indicating actions to perform to service items of equipment. The virtual assistant application can receive information regarding an item of equipment to be serviced, such as sensor data, text descriptions, or camera images, and process the received information using the second model 116 to generate corresponding responses.

For example, the virtual assistant application 120 can be implemented in a UI/UX wizard configuration, such as to provide a sequence of requests for information from the user (the sequence may include requests that are at least one of predetermined or dynamically generated responsive to inputs from the user for previous requests). For example, the virtual assistant application 120 can provide one or more requests for users such as service technicians, facility managers, or other occupants, and provide the received responses to at least one of the second model 116 or a root cause detection function (e.g., algorithm, model, data structure mapping inputs to candidate causes, etc.) to determine a prediction of a cause of the issue of the item of equipment and/or solutions. The virtual assistant application 120 can use requests for information such as for unstructured text by which the user describes characteristics of the item of equipment relating to the issue; answers expected to correspond to different scenarios indicative of the issue; and/or image and/or video input (e.g., images of problems, equipment, spaces, etc. that can provide more context around the issue and/or configurations). For example, responsive to receiving a response via the virtual assistant application 120 indicating that the problem is with temperature in the space, the system 100 can request, via the virtual assistant application 120, information regarding HVAC-R equipment associated with the space, such as pictures of the space, an air handling unit, a chiller, or various combinations thereof.

The virtual assistant application 120 can include a plurality of applications 120 (e.g., variations of interfaces or customizations of interfaces) for a plurality of respective user types. For example, the virtual assistant application 120 can include a first application 120 for a customer user, and a second application 120 for a service technician user. The virtual assistant applications 120 can allow for updating and other communications between the first and second applications 120 as well as the second model 116. Using one or more of the first application 120 and the second application 120, the system 100 can manage continuous/real-time conversations for one or more users, and evaluate the users' engagement with the information provided (e.g., did the user, customer, service technician, etc., follow the provided steps for responding to the issue or performing service, did the user discontinue providing inputs to the virtual assistant application 120, etc.), such as to enable the system 100 to update the information generated by the second model 116 for the virtual assistant application 120 according to the engagement. In some implementations, the system 100 can use the second model 116 to detect sentiment of the user of the virtual assistant application 120, and update the second model 116 according to the detected sentiment, such as to improve the experience provided by the virtual assistant application 120.

The applications 120 can include at least one document writer application 120, such as a technical document writer. The document writer application 120 can facilitate preparing structured (e.g. form-based) and/or unstructured documentation, such as documentation associated with service requests. For example, the document writer application 120 can present a user interface corresponding to a template document to be prepared that is associated with at least one of a service request or the item of equipment for which the service request is generated, such as to present one or more predefined form sections or fields. The document writer application 120 can use inputs, such as prompts received from the users and/or technical data provided by the user regarding the item of equipment, such as sensor data, text descriptions, or camera images, to generate information to include in the documentation. For example, the document writer application 120 can provide the inputs to the second model 116 to cause the second model 116 to generate completions for text information to include in the fields of the documentation.

The applications 120 can include, in some implementations, at least one diagnostics and troubleshooting application 120. The diagnostics and troubleshooting application 120 can receive inputs including at least one of a service request or information regarding the item of equipment to be serviced, such as information identified by a service technician. The diagnostics and troubleshooting application 120 can provide the inputs to a corresponding second model 116 to cause the second model 116 to generate outputs such as indications of potential items to be checked regarding the item of equipment, modifications or fixes to make to perform the service, or values or ranges of values of parameters of the item of equipment that may be indicative of specific issues to for the service technician to address or repair.

The applications 120 can at least one service recommendation generator application 120. The service recommendation generator application 120 can receive inputs such as a service request or information regarding the item of equipment to be serviced, and provide the inputs to the second model 116 to cause the second model 116 to generate outputs for presenting service recommendations, such as actions to perform to address the service request.

In some implementations, the applications 120 can include a product recommendation generator application 120. The product recommendation generator application 120 can process inputs such as information regarding the item of equipment or the service request, using one or more second models 116 (e.g., models trained using parts data from the data sources 112), to determine a recommendation of a part or product to replace or otherwise use for repairing the item of equipment.

In some implementations, the applications 120 can include a copilot application 120 which uses the one or more second models 116. The copilot application 120 can help guide a user (e.g., building manager, occupant, technician) in coordinating operations of multiple separate domain systems that serve a building. Operations of the copilot application 120 are described in further detail below with reference to FIGS. 9-10. The copilot application 120 can provide a conversational interface between a user and the building, autonomously generating outputs, control signals, instructions, etc. for the different domain systems in different data formats (protocols, structures, etc.) suitable for the different domain systems while insulating the user from such complexities. The copilot application 120 can thereby provide a unified, easy-to-use conversational interaction between a user and various domain systems serving the building, including in a manner which provides for coordinated operation of multiple domain systems in accordance with recommendations generated by the copilot application 120 in response to unstructured (e.g., freeform, natural language, textual, spoken) inputs from a user.

Feedback Training

Referring further to FIG. 1, the system 100 can include at least one feedback trainer 128 coupled with at least one feedback repository 124. The system 100 can use the feedback trainer 128 to increase the precision and/or accuracy of the outputs generated by the second models 116 according to feedback provided by users of the system 100 and/or the applications 120.

The feedback repository 124 can include feedback received from users regarding output presented by the applications 120. For example, for at least a subset of outputs presented by the applications 120, the applications 120 can present one or more user input elements for receiving feedback regarding the outputs. The user input elements can include, for example, indications of binary feedback regarding the outputs (e.g., good/bad feedback; feedback indicating the outputs do or do not meet the user's criteria, such as criteria regarding technical accuracy or precision); indications of multiple levels of feedback (e.g., scoring the outputs on a predetermined scale, such as a 1-5 scale or 1-10 scale); freeform feedback (e.g., text or audio feedback); or various combinations thereof.

The system 100 can store and/or maintain feedback in the feedback repository 124. In some implementations, the system 100 stores the feedback with one or more data elements associated with the feedback, including but not limited to the outputs for which the feedback was received, the second model(s) 116 used to generate the outputs, and/or input information used by the second models 116 to generate the outputs (e.g., service request information; information captured by the user regarding the item of equipment).

The feedback trainer 128 can update the one or more second models 116 using the feedback. The feedback trainer 128 can be similar to the model updater 108. In some implementations, the feedback trainer 128 is implemented by the model updater 108; for example, the model updater 108 can include or be coupled with the feedback trainer 128. The feedback trainer 128 can perform various configuration operations (e.g., retraining, fine-tuning, transfer learning, etc.) on the second models 116 using the feedback from the feedback repository 124. In some implementations, the feedback trainer 128 identifies one or more first parameters of the second model 116 to maintain as having predetermined values (e.g., freeze the weights and/or biases of one or more first layers of the second model 116), and performs a training process, such as a fine tuning process, to configure parameters of one or more second parameters of the second model 116 using the feedback (e.g., one or more second layers of the second model 116, such as output layers or output heads of the second model 116).

In some implementations, the system 100 may not include and/or use the model updater 108 (or the feedback trainer 128) to determine the second models 116. For example, the system 100 can include or be coupled with an output processor (e.g., an output processor similar or identical to accuracy checker 316 described with reference to FIG. 3) that can evaluate and/or modify outputs from the first model 104 prior to operation of applications 120, including to perform any of various post-processing operations on the output from the first model 104. For example, the output processor can compare outputs of the first model 104 with data from data sources 112 to validate the outputs of the first model 104 and/or modify the outputs of the first model 104 (or output an error) responsive to the outputs not satisfying a validation condition.

Connected Machine Learning Models

Referring further to FIG. 1, the second model 116 can be coupled with one or more third models, functions, or algorithms for training/configuration and/or runtime operations. The third models can include, for example and without limitation, any of various models relating to items of equipment, such as energy usage models, sustainability models, carbon models, air quality models, or occupant comfort models. For example, the second model 116 can be used to process unstructured information regarding items of equipment into predefined template formats compatible with various third models, such that outputs of the second model 116 can be provided as inputs to the third models; this can allow more accurate training of the third models, more training data to be generated for the third models, and/or more data available for use by the third models. The second model 116 can receive inputs from one or more third models, which can provide greater data to the second model 116 for processing.

Automated Service Scheduling and Provisioning

The system 100 can be used to automate operations for scheduling, provisioning, and deploying service technicians and resources for service technicians to perform service operations. For example, the system 100 can use at least one of the first model 104 or the second model 116 to determine, based on processing information regarding service operations for items of equipment relative to completion criteria for the service operation, particular characteristics of service operations such as experience parameters of scheduled service technicians, identifiers of parts provided for the service operations, geographical data, types of customers, types of problems, or information content provided to the service technicians to facilitate the service operation, where such characteristics correspond to the completion criteria being satisfied (e.g., where such characteristics correspond to an increase in likelihood of the completion criteria being satisfied relative to other characteristics for service technicians, parts, information content, etc.). For example, the system 100 can determine, for a given item of equipment, particular parts to include on a truck to be sent to the site of the item of equipment. As such, the system 100, responsive to processing inputs at runtime such as service requests, can automatically and more accurately identify service technicians and parts to direct to the item of equipment for the service operations. The system 100 can use timing information to perform batch scheduling for multiple service operations and/or multiple technicians for the same or multiple service operations. The system 100 can perform batch scheduling for multiple trucks for multiple items of equipment, such as to schedule a first one or more parts having a greater likelihood for satisfying the completion criteria for a first item of equipment on a first truck, and a second one or more parts having a greater likelihood for satisfying the completion criteria for a second item of equipment on a second truck.

Figure 2:
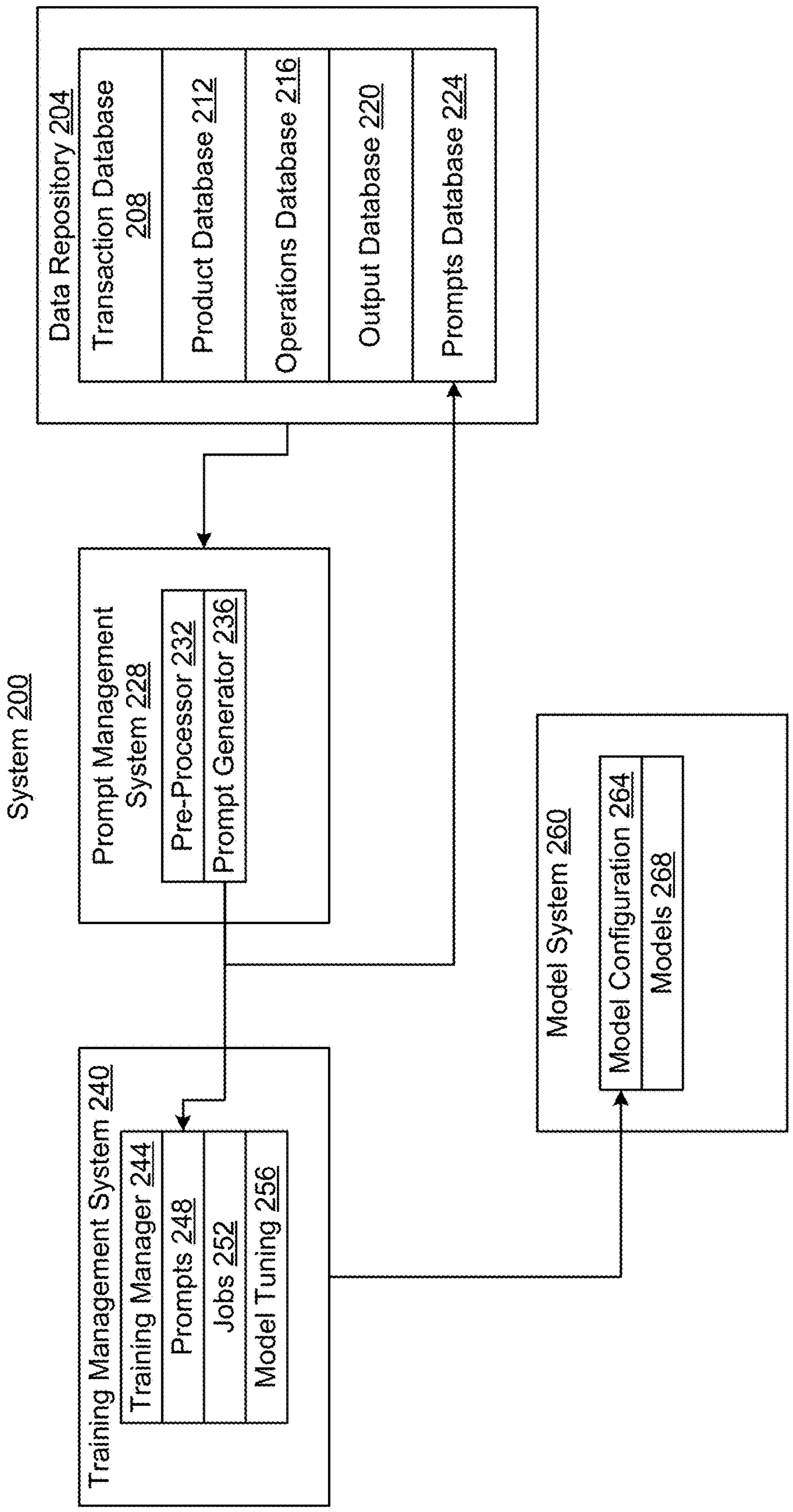
FIG. 2 is a block diagram of an example of a language model-based system for equipment servicing applications.

II. System Architectures for Generative AI Applications for Building Management System and Equipment Servicing FIG. 2 depicts an example of a system 200. The system 200 can include one or more components or features of the system 100, such as any one or more of the first model 104, data sources 112, second model 116, applications 120, feedback repository 124, and/or feedback trainer 128. The system 200 can perform specific operations to enable generative AI applications for building managements systems and equipment servicing, such as various manners of processing input data into training data (e.g., tokenizing input data; forming input data into prompts and/or completions), and managing training and other machine learning model configuration processes. Various components of the system 200 can be implemented using one or more computer systems, which may be provided on the same or different processors (e.g., processors communicatively coupled via wired and/or wireless connections).

The system 200 can include at least one data repository 204, which can be similar to the data sources 112 described with reference to FIG. 1. For example, the data repository 204 can include a transaction database 208, which can be similar or identical to one or more of warranty data or service data of data sources 112. For example, the transaction database 208 can include data such as parts used for service transactions; sales data indicating various service transactions or other transactions regarding items of equipment; warranty and/or claims data regarding items of equipment; and service data.

The data repository 204 can include a product database 212, which can be similar or identical to the parts data of the data sources 112. The product database 212 can include, for example, data regarding products available from various vendors, specifications or parameters regarding products, and indications of products used for various service operations. The products database 212 can include data such as events or alarms associated with products; logs of product operation; and/or time series data regarding product operation, such as longitudinal data values of operation of products and/or building equipment.

The data repository 204 can include an operations database 216, which can be similar or identical to the operations data of the data sources 112. For example, the operations database 216 can include data such as manuals regarding parts, products, and/or items of equipment; customer service data; and or reports, such as operation or service logs.

In some implementations, the data repository 204 can include an output database 220, which can include data of outputs that may be generated by various machine learning models and/or algorithms. For example, the output database 220 can include values of pre-calculated predictions and/or insights, such as parameters regarding operation items of equipment, such as setpoints, changes in setpoints, flow rates, control schemes, identifications of error conditions, or various combinations thereof.

As depicted in FIG. 2, the system 200 can include a prompt management system 228. The prompt management system 228 can include one or more rules, heuristics, logic, policies, algorithms, functions, machine learning models, neural networks, scripts, or various combinations thereof to perform operations including processing data from data repository 204 into training data for configuring various machine learning models. For example, the prompt management system 228 can retrieve and/or receive data from the data repository 228, and determine training data elements that include examples of input and outputs for generation by machine learning models, such as a training data element that includes a prompt and a completion corresponding to the prompt, based on the data from the data repository 228.

In some implementations, the prompt management system 228 includes a pre-processor 232. The pre-processor 232 can perform various operations to prepare the data from the data repository 204 for prompt generation. For example, the pre-processor 232 can perform any of various filtering, compression, tokenizing, or combining (e.g., combining data from various databases of the data repository 204) operations.

The prompt management system 228 can include a prompt generator 236. The prompt generator 236 can generate, from data of the data repository 204, one or more training data elements that include a prompt and a completion corresponding to the prompt. In some implementations, the prompt generator 236 receives user input indicative of prompt and completion portions of data. For example, the user input can indicate template portions representing prompts of structured data, such as predefined fields or forms of documents, and corresponding completions provided for the documents. The user input can assign prompts to unstructured data. In some implementations, the prompt generator 236 automatically determines prompts and completions from data of the data repository 204, such as by using any of various natural language processing algorithms to detect prompts and completions from data. In some implementations, the system 200 does not identify distinct prompts and completions from data of the data repository 204.

Referring further to FIG. 2, the system 200 can include a training management system 240. The training management system 240 can include one or more rules, heuristics, logic, policies, algorithms, functions, machine learning models, neural networks, scripts, or various combinations thereof to perform operations including controlling training of machine learning models, including performing fine tuning and/or transfer learning operations.

The training management system 240 can include a training manager 244. The training manager 244 can incorporate features of at least one of the model updater 108 or the feedback trainer 128 described with reference to FIG. 1. For example, the training manager 244 can provide training data including a plurality of training data elements (e.g., prompts and corresponding completions) to the model system 260 as described further herein to facilitate training machine learning models.

In some implementations, the training management system 240 includes a prompts database 248. For example, the training management system 240 can store one or more training data elements from the prompt management system 228, such as to facilitate asynchronous and/or batched training processes.

The training manager 244 can control the training of machine learning models using information or instructions maintained in a model tuning database 256. For example, the training manager 244 can store, in the model tuning database 256, various parameters or hyperparameters for models and/or model training.

In some implementations, the training manager 244 stores a record of training operations in a jobs database 252. For example, the training manager 244 can maintain data such as a queue of training jobs, parameters or hyperparameters to be used for training jobs, or information regarding performance of training.

Referring further to FIG. 2, the system 200 can include at least one model system 260 (e.g., one or more language model systems). The model system 260 can include one or more rules, heuristics, logic, policies, algorithms, functions, machine learning models, neural networks, scripts, or various combinations thereof to perform operations including configuring one or more machine learning models 268 based on instructions from the training management system 240. In some implementations, the training management system 240 implements the model system 260. In some implementations, the training management system 240 can access the model system 260 using one or more APIs, such as to provide training data and/or instructions for configuring machine learning models 268 via the one or more APIs. The model system 260 can operate as a service layer for configuring the machine learning models 268 responsive to instructions from the training management system 240. The machine learning models 268 can be or include the first model 104 and/or second model 116 described with reference to FIG. 1.

The model system 260 can include a model configuration processor 264. The model configuration processor 264 can incorporate features of the model updater 108 and/or the feedback trainer 128 described with reference to FIG. 1. For example, the model configuration processor 264 can apply training data (e.g., prompts 248 and corresponding completions) to the machine learning models 268 to configure (e.g., train, modify, update, fine-tune, etc.) the machine learning models 268. The training manager 244 can control training by the model configuration processor 264 based on model tuning parameters in the model tuning database 256, such as to control various hyperparameters for training. In various implementations, the system 200 can use the training management system 240 to configure the machine learning models 268 in a similar manner as described with reference to the second model 116 of FIG. 1, such as to train the machine learning models 268 using any of various data or combinations of data from the data repository 204.

Application Session Management

Figure 3:
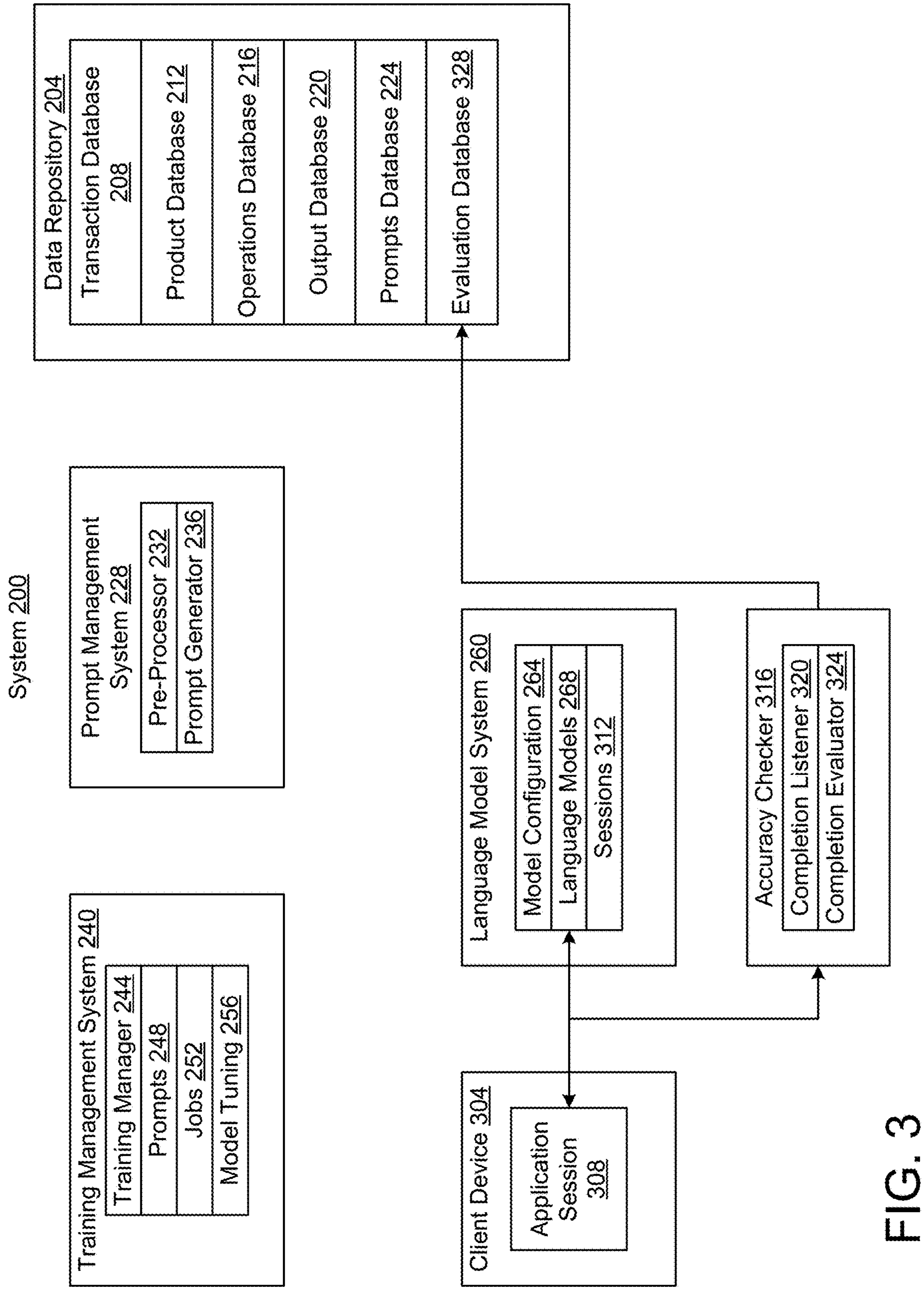
FIG. 3 is a block diagram of an example of the system of FIG. 2 including user application session components.

FIG. 3 depicts an example of the system 200, in which the system 200 can perform operations to implement at least one application session 308 for a client device 304. For example, responsive to configuring the machine learning models 268, the system 200 can generate data for presentation by the client device 304 (including generating data responsive to information received from the client device 304) using the at least one application session 308 and the one or more machine learning models 268.

The client device 304 can be a device of a user, such as a technician or building manager. The client device 304 can include any of various wireless or wired communication interfaces to communicate data with the model system 260, such as to provide requests to the model system 260 indicative of data for the machine learning models 268 to generate, and to receive outputs from the model system 260. The client device 304 can include various user input and output devices to facilitate receiving and presenting inputs and outputs.

In some implementations, the system 200 provides data to the client device 304 for the client device 304 to operate the at least one application session 308. The application session 308 can include a session corresponding to any of the applications 120 described with reference to FIG. 1. For example, the client device 304 can launch the application session 308 and provide an interface to request one or more prompts. Responsive to receiving the one or more prompts, the application session 308 can provide the one or more prompts as input to the machine learning model 268. The machine learning model 268 can process the input to generate a completion, and provide the completion to the application session 308 to present via the client device 304. In some implementations, the application session 308 can iteratively generate completions using the machine learning models 268. For example, the machine learning models 268 can receive a first prompt from the application session 308, determine a first completion based on the first prompt and provide the first completion to the application session 308, receive a second prompt from the application 308, determine a second completion based on the second prompt (which may include at least one of the first prompt or the first completion concatenated to the second prompt), and provide the second completion to the application session 308.

In some implementations, the model system 260 includes at least one sessions database 312. The sessions database 312 can maintain records of application session 308 implemented by client devices 304. For example, the sessions database 312 can include records of prompts provided to the machine learning models 268 and completions generated by the machine learning models 268. As described further with reference to FIG. 4, the system 200 can use the data in the sessions database 312 to fine-tune or otherwise update the machine learning models 268.

Completion Checking

In some implementations, the system 200 includes an accuracy checker 316. The accuracy checker 316 can include one or more rules, heuristics, logic, policies, algorithms, functions, machine learning models, neural networks, scripts, or various combinations thereof to perform operations including evaluating performance criteria regarding the completions determined by the model system 260. For example, the accuracy checker 316 can include at least one completion listener 320. The completion listener 320 can receive the completions determined by the model system 320 (e.g., responsive to the completions being generated by the machine learning model 268 and/or by retrieving the completions from the sessions database 312).

The accuracy checker 316 can include at least one completion evaluator 324. The completion evaluator 324 can evaluate the completions (e.g., as received or retrieved by the completion listener 320) according to various criteria. In some implementations, the completion evaluator 324 evaluates the completions by comparing the completions with corresponding data from the data repository 204. For example, the completion evaluator 324 can identify data of the data repository 204 having similar text as the prompts and/or completions (e.g., using any of various natural language processing algorithms), and determine whether the data of the completions is within a range of expected data represented by the data of the data repository 204.

In some implementations, the accuracy checker 316 can store an output from evaluating the completion (e.g., an indication of whether the completion satisfies the criteria) in an evaluation database 328. For example, the accuracy checker 316 can assign the output (which may indicate at least one of a binary indication of whether the completion satisfied the criteria or an indication of a portion of the completion that did not satisfy the criteria) to the completion for storage in the evaluation database 328, which can facilitate further training of the machine learning models 268 using the completions and output.

Feedback Training

Figure 4:
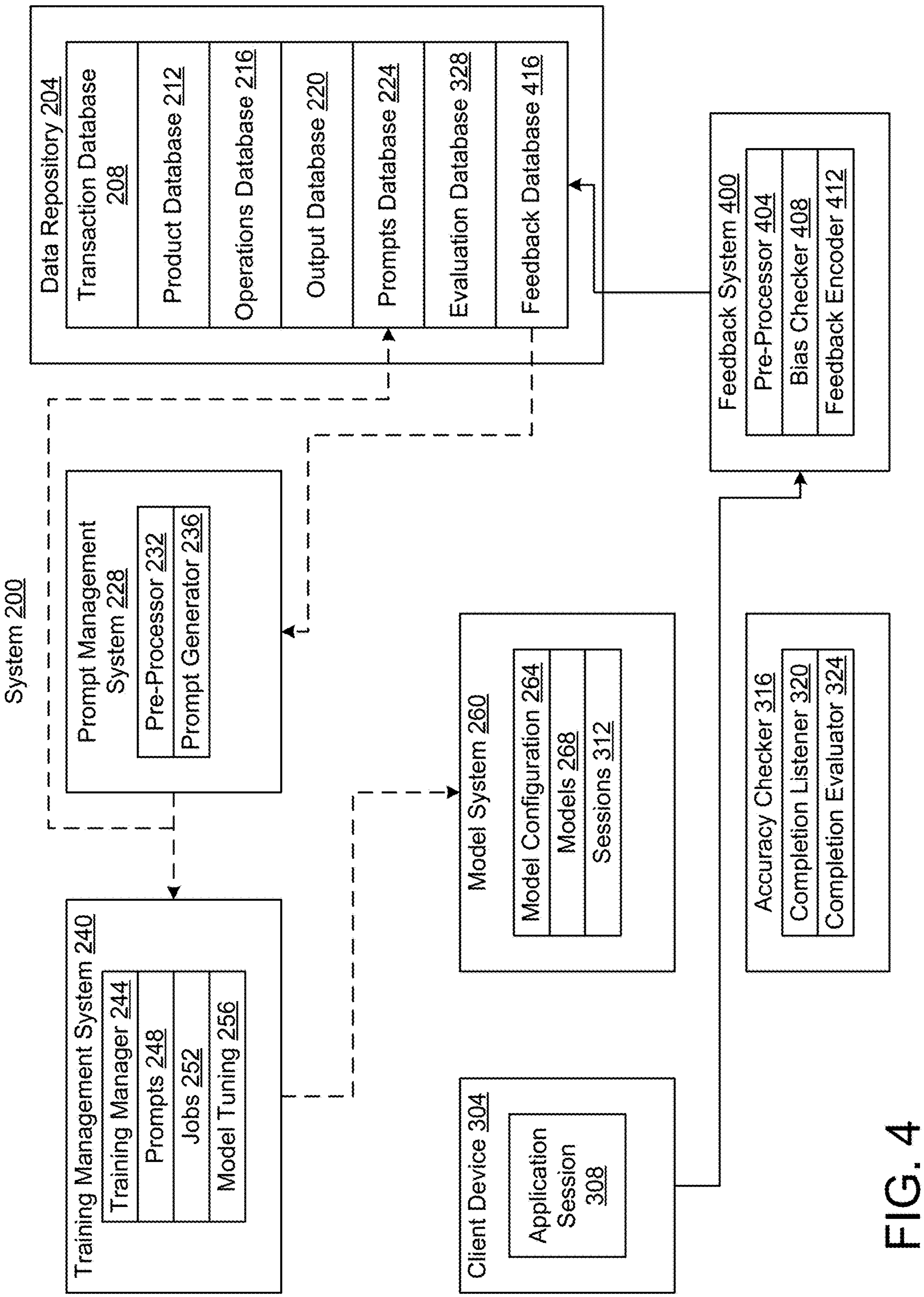
FIG. 4 is a block diagram of an example of the system of FIG. 2 including feedback training components.

FIG. 4 depicts an example of the system 200 that includes a feedback system 400, such as a feedback aggregator. The feedback system 400 can include one or more rules, heuristics, logic, policies, algorithms, functions, machine learning models, neural networks, scripts, or various combinations thereof to perform operations including preparing data for updating and/or updating the machine learning models 268 using feedback corresponding to the application sessions 308, such as feedback received as user input associated with outputs presented by the application sessions 308. The feedback system 400 can incorporate features of the feedback repository 124 and/or feedback trainer 128 described with reference to FIG. 1.

The feedback system 400 can receive feedback (e.g., from the client device 304) in various formats. For example, the feedback can include any of text, speech, audio, image, and/or video data. The feedback can be associated (e.g., in a data structure generated by the application session 308) with the outputs of the machine learning models 268 for which the feedback is provided. The feedback can be received or extracted from various forms of data, including external data sources such as manuals, service reports, or Wikipedia-type documentation.

In some implementations, the feedback system 400 includes a pre-processor 400. The pre-processor 400 can perform any of various operations to modify the feedback for further processing. For example, the pre-processor 400 can incorporate features of, or be implemented by, the pre-processor 232, such as to perform operations including filtering, compression, tokenizing, or translation operations (e.g., translation into a common language of the data of the data repository 204).

The feedback system 400 can include a bias checker 408. The bias checker 408 can evaluate the feedback using various bias criteria, and control inclusion of the feedback in a feedback database 416 (e.g., a feedback database 416 of the data repository 204 as depicted in FIG. 4) according to the evaluation. The bias criteria can include, for example and without limitation, criteria regarding qualitative and/or quantitative differences between a range or statistic measure of the feedback relative to actual, expected, or validated values.

The feedback system 400 can include a feedback encoder 412. The feedback encoder 412 can process the feedback (e.g., responsive to bias checking by the bias checker 408) for inclusion in the feedback database 416. For example, the feedback encoder 412 can encode the feedback as values corresponding to outputs scoring determined by the model system 260 while generating completions (e.g., where the feedback indicates that the completion presented via the application session 308 was acceptable, the feedback encoder 412 can encode the feedback by associating the feedback with the completion and assigning a relatively high score to the completion).

As indicated by the dashed arrows in FIG. 4, the feedback can be used by the prompt management system 228 and training management system 240 to further update one or more machine learning models 268. For example, the prompt management system 228 can retrieve at least one feedback (and corresponding prompt and completion data) from the feedback database 416, and process the at least one feedback to determine a feedback prompt and feedback completion to provide to the training management system 240 (e.g., using pre-processor 232 and/or prompt generator 236, and assigning a score corresponding to the feedback to the feedback completion). The training manager 244 can provide instructions to the model system 260 to update the machine learning models 268 using the feedback prompt and the feedback completion, such as to perform a fine-tuning process using the feedback prompt and the feedback completion. In some implementations, the training management system 240 performs a batch process of feedback-based fine tuning by using the prompt management system 228 to generate a plurality of feedback prompts and a plurality of feedback completion, and providing instructions to the model system 260 to perform the fine-tuning process using the plurality of feedback prompts and the plurality of feedback completions.

Data Filtering and Validation Systems

Figure 5:
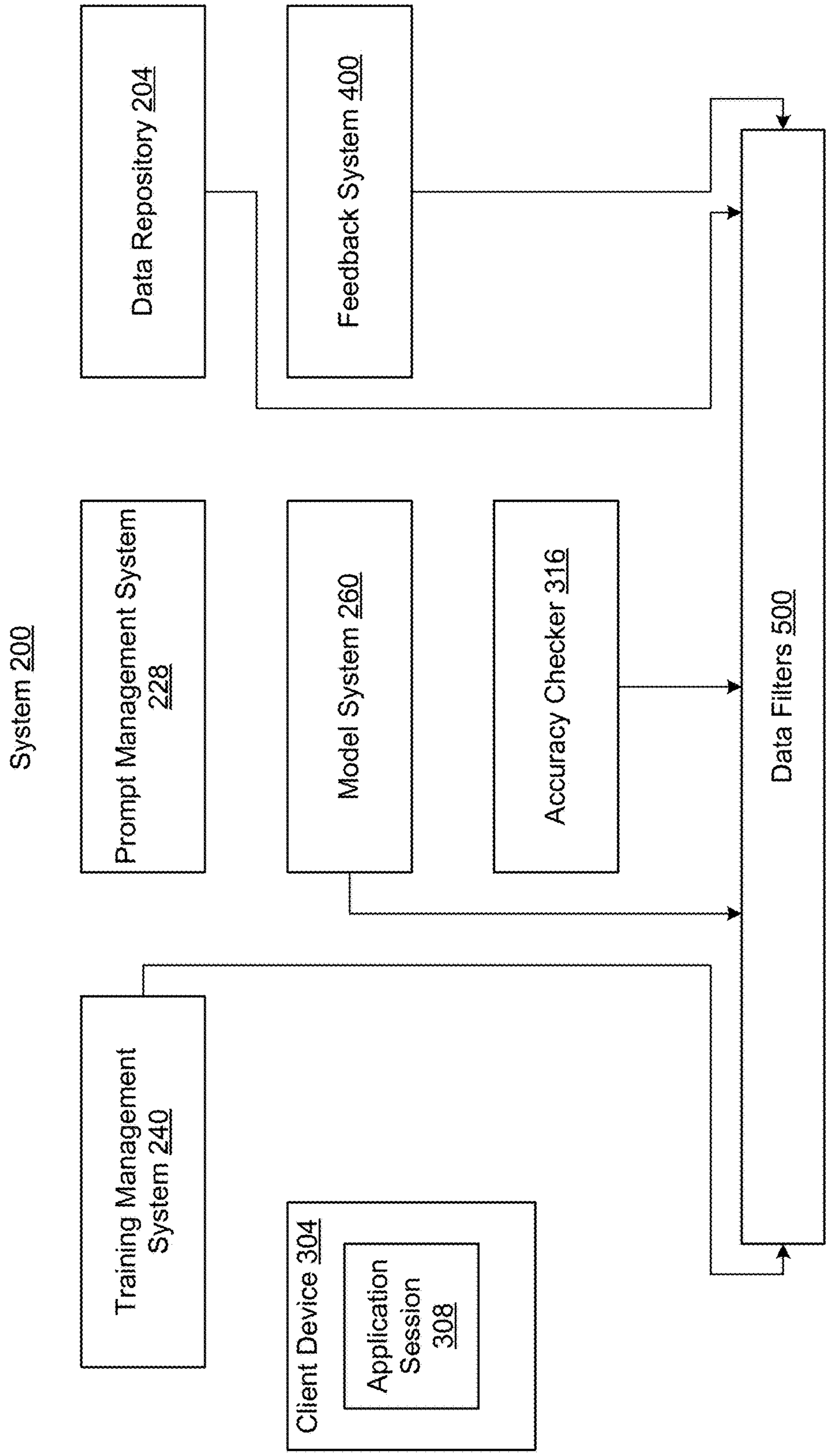
FIG. 5 is a block diagram of an example of the system of FIG. 2 including data filters.

FIG. 5 depicts an example of the system 200, where the system 200 can include one or more data filters 500 (e.g., data validators). The data filters 500 can include any one or more rules, heuristics, logic, policies, algorithms, functions, machine learning models, neural networks, scripts, or various combinations thereof to perform operations including modifying data processed by the system 200 and/or triggering alerts responsive to the data not satisfying corresponding criteria, such as thresholds for values of data. Various data filtering processes described with reference to FIG. 5 (as well as FIGS. 6 and 7) can enable the system 200 to implement timely operations for improving the precision and/or accuracy of completions or other information generated by the system 200 (e.g., including improving the accuracy of feedback data used for fine-tuning the machine learning models 268). The data filters 500 can allow for interactions between various algorithms, models, and computational processes.

For example, the data filters 500 can be used to evaluate data relative to thresholds relating to data including, for example and without limitation, acceptable data ranges, setpoints, temperatures, pressures, flow rates (e.g., mass flow rates), or vibration rates for an item of equipment. The threshold can include any of various thresholds, such as one or more of minimum, maximum, absolute, relative, fixed band, and/or floating band thresholds.

The data filters 500 can enable the system 200 to detect when data, such as prompts, completions, or other inputs and/or outputs of the system 200, collide with thresholds that represent realistic behavior or operation or other limits of items of equipment. For example, the thresholds of the data filters 500 can correspond to values of data that are within feasible or recommended operating ranges. In some implementations, the system 200 determines or receives the thresholds using models or simulations of items of equipment, such as plant or equipment simulators, chiller models, HVAC-R models, refrigeration cycle models, etc. The system 200 can receive the thresholds as user input (e.g., from experts, technicians, or other users). The thresholds of the data filters 500 can be based on information from various data sources. The thresholds can include, for example and without limitation, thresholds based on information such as equipment limitations, safety margins, physics, expert teaching, etc. For example, the data filters 500 can include thresholds determined from various models, functions, or data structures (e.g., tables) representing physical properties and processes, such as physics of psychometrics, thermodynamics, and/or fluid dynamics information.

The system 200 can determine the thresholds using the feedback system 400 and/or the client device 304, such as by providing a request for feedback that includes a request for a corresponding threshold associated with the completion and/or prompt presented by the application session 308. For example, the system 200 can use the feedback to identify realistic thresholds, such as by using feedback regarding data generated by the machine learning models 268 for ranges, setpoints, and/or start-up or operating sequences regarding items of equipment (and which can thus be validated by human experts). In some implementations, the system 200 selectively requests feedback indicative of thresholds based on an identifier of a user of the application session 308, such as to selectively request feedback from users having predetermined levels of expertise and/or assign weights to feedback according to criteria such as levels of expertise.

In some implementations, one or more data filters 500 correspond to a given setup. For example, the setup can represent a configuration of a corresponding item of equipment (e.g., configuration of a chiller, etc.). The data filters 500 can represent various thresholds or conditions with respect to values for the configuration, such as feasible or recommendation operating ranges for the values. In some implementations, one or more data filters 500 correspond to a given situation. For example, the situation can represent at least one of an operating mode or a condition of a corresponding item of equipment.

FIG. 5 depicts some examples of data (e.g., inputs, outputs, and/or data communicated between nodes of machine learning models 268) to which the data filters 500 can be applied to evaluate data processed by the system 200 including various inputs and outputs of the system 200 and components thereof. This can include, for example and without limitation, filtering data such as data communicated between one or more of the data repository 204, prompt management system 228, training management system 240, model system 260, client device 304, accuracy checker 316, and/or feedback system 400. For example, the data filters 500 (as well as validation system 600 described with reference to FIG. 6 and/or expert filter collision system 700 described with reference to FIG. 7) can receive data outputted from a source (e.g., source component) of the system 200 for receipt by a destination (e.g., destination component) of the system 200, and filter, modify, or otherwise process the outputted data prior to the system 200 providing the outputted data to the destination. The sources and destinations can include any of various combinations of components and systems of the system 200.

The system 200 can perform various actions responsive to the processing of data by the data filters 500. In some implementations, the system 200 can pass data to a destination without modifying the data (e.g., retaining a value of the data prior to evaluation by the data filter 500) responsive to the data satisfying the criteria of the respective data filter(s) 500. In some implementations, the system 200 can at least one of (i) modify the data or (ii) output an alert responsive to the data not satisfying the criteria of the respective data filter(s) 500. For example, the system 200 can modify the data by modifying one or more values of the data to be within the criteria of the data filters 500.

In some implementations, the system 200 modifies the data by causing the machine learning models 268 to regenerate the completion corresponding to the data (e.g., for up to a predetermined threshold number of regeneration attempts before triggering the alert). This can enable the data filters 500 and the system 200 selectively trigger alerts responsive to determining that the data (e.g., the collision between the data and the thresholds of the data filters 500) may not be repairable by the machine learning model 268 aspects of the system 200.

The system 200 can output the alert to the client device 304. The system 200 can assign a flag corresponding to the alert to at least one of the prompt (e.g., in prompts database 224) or the completion having the data that triggered the alert.

Figure 6:
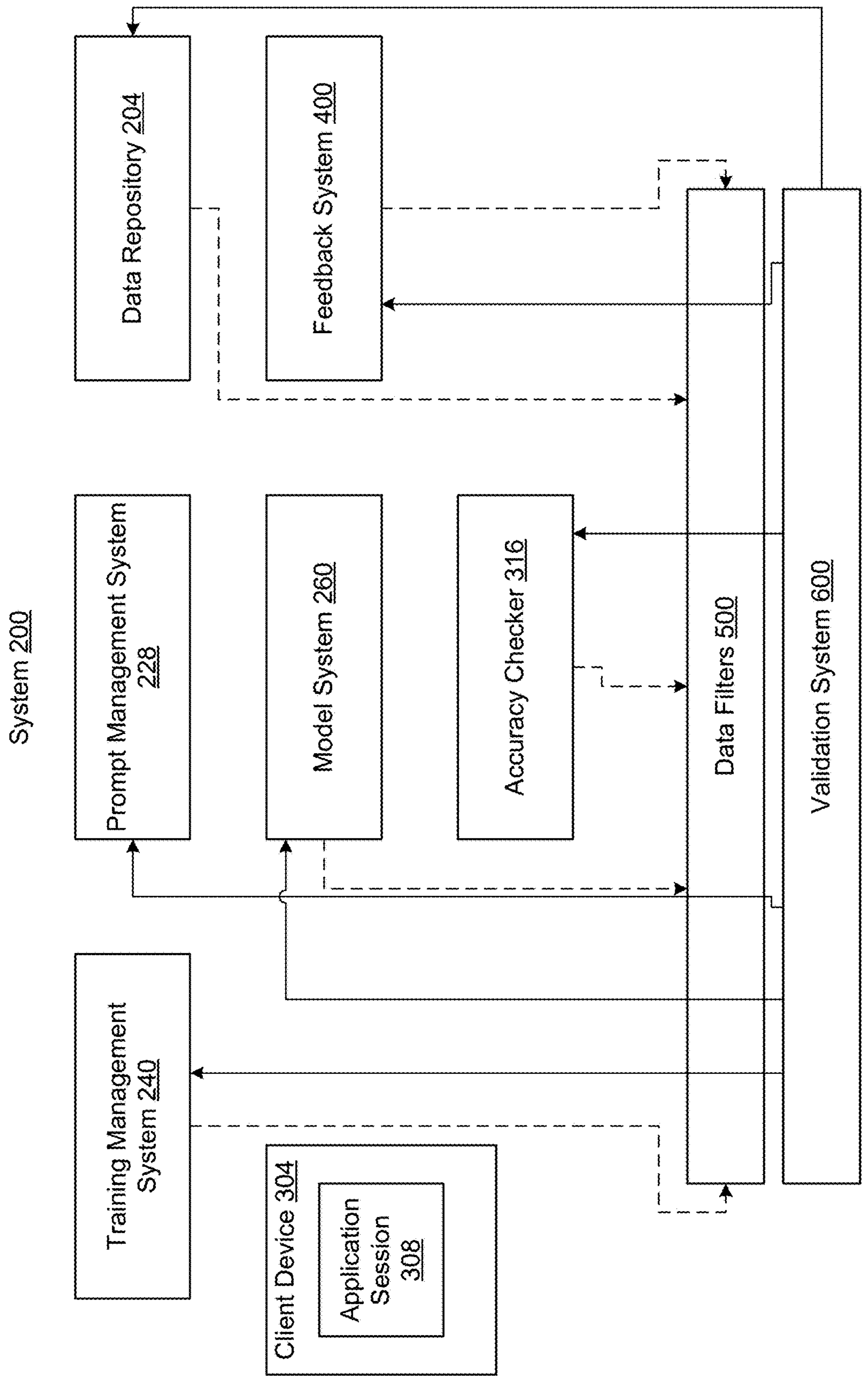
FIG. 6 is a block diagram of an example of the system of FIG. 2 including data validation components.

FIG. 6 depicts an example of the system 200, in which a validation system 600 is coupled with one or more components of the system 200, such as to process and/or modify data communicated between the components of the system 200. For example, the validation system 600 can provide a validation interface for human users (e.g., expert supervisors, checkers) and/or expert systems (e.g., data validation systems that can implement processes analogous to those described with reference to the data filters 500) to receive data of the system 200 and modify, validate, or otherwise process the data. For example, the validation system 600 can provide to human expert supervisors, human checkers, and/or expert systems various data of the system 200, receive responses to the provided data indicating requested modifications to the data or validations of the data, and modify (or validate) the provided data according to the responses.

For example, the validation system 600 can receive data such as data retrieved from the data repository 204, prompts outputted by the prompt management system 228, completions outputted by the model system 260, indications of accuracy outputted by the accuracy checker 316, etc., and provide the received data to at least one of an expert system or a user interface. In some implementations, the validation system 600 receives a given item of data prior to the given item of data being processed by the model system 260, such as to validate inputs to the machine learning models 268 prior to the inputs being processed by the machine learning models 268 to generate outputs, such as completions.

In some implementations, the validation system 600 validates data by at least one of (i) assigning a label (e.g., a flag, etc.) to the data indicating that the data is validated or (ii) passing the data to a destination without modifying the data. For example, responsive to receiving at least one of a user input (e.g., from a human validator/supervisor/expert) that the data is valid or an indication from an expert system that the data is valid, the validation system 600 can assign the label and/or provide the data to the destination.

The validation system 600 can selectively provide data from the system 200 to the validation interface responsive to operation of the data filters 500. This can enable the validation system 600 to trigger validation of the data responsive to collision of the data with the criteria of the data filters 500. For example, responsive to the data filters 500 determining that an item of data does not satisfy a corresponding criteria, the data filters 500 can provide the item of data to the validation system 600. The data filters 500 can assign various labels to the item of data, such as indications of the values of the thresholds that the data filters 500 used to determine that the item of data did not satisfy the thresholds. Responsive to receiving the item of data from the data filters 500, the validation system 600 can provide the item of data to the validation interface (e.g., to a user interface of client device 304 and/or application session 308; for comparison with a model, simulation, algorithm, or other operation of an expert system) for validation. In some implementations, the validation system 600 can receive an indication that the item of data is valid (e.g., even if the item of data did not satisfy the criteria of the data filters 500) and can provide the indication to the data filters 500 to cause the data filters 500 to at least partially modify the respective thresholds according to the indication.

In some implementations, the validation system 600 selectively retrieves data for validation where (i) the data is determined or outputted prior to use by the machine learning models 268, such as data from the data repository 204 or the prompt management system 228, or (ii) the data does not satisfy a respective data filter 500 that processes the data. This can enable the system 200, the data filters 500, and the validation system 600 to update the machine learning models 268 and other machine learning aspects (e.g., generative AI aspects) of the system 200 to more accurately generate data and completions (e.g., enabling the data filters 500 to generate alerts that are received by the human experts/expert systems that may be repairable by adjustments to one or more components of the system 200).

Figure 7:
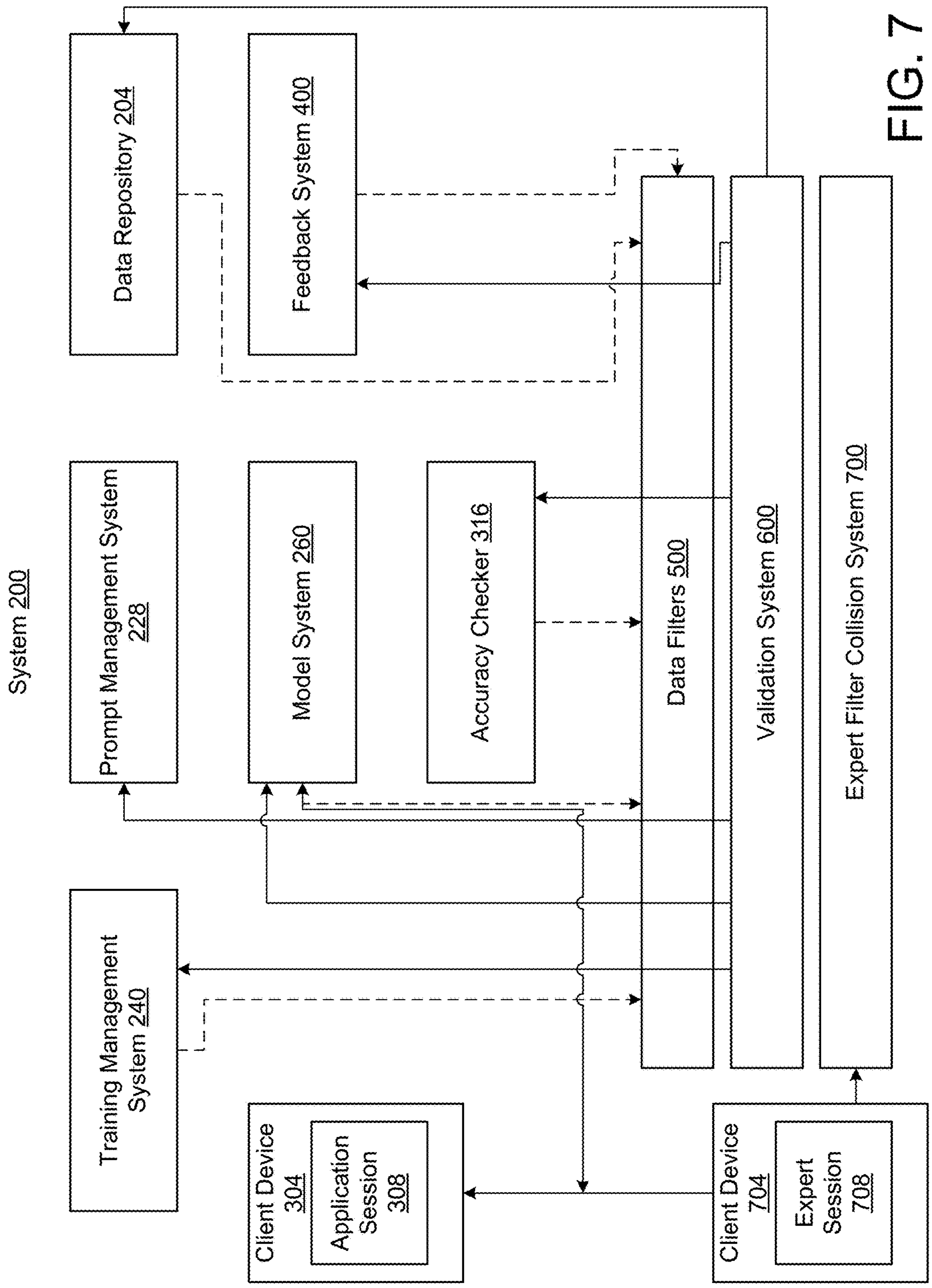
FIG. 7 is a block diagram of an example of the system of FIG. 2 including expert review and intervention components.

FIG. 7 depicts an example of the system 200, in which an expert filter collision system 700 ("expert system" 700) can facilitate providing feedback and providing more accurate and/or precise data and completions to a user via the application session 308. For example, the expert system 700 can interface with various points and/or data flows of the system 200, as depicted in FIG. 7, where the system 200 can provide data to the expert filter collision system 700, such as to transmit the data to a user interface and/or present the data via a user interface of the expert filter collision system 700 that can accessed via an expert session 708 of a client device 704. For example, via the expert session 708, the expert session 700 can enable functions such as receiving inputs for a human expert to provide feedback to a user of the client device 304; a human expert to guide the user through the data (e.g., completions) provided to the client device 304, such as reports, insights, and action items; a human expert to review and/or provide feedback for revising insights, guidance, and recommendations before being presented by the application session 308; a human expert to adjust and/or validate insights or recommendations before they are viewed or used for actions by the user; or various combinations thereof. In some implementations, the expert system 700 can use feedback received via the expert session as inputs to update the machine learning models 268 (e.g., to perform fine-tuning).

In some implementations, the expert system 700 retrieves data to be provided to the application session 308, such as completions generated by the machine learning models 268. The expert system 700 can present the data via the expert session 708, such as to request feedback regarding the data from the client device 704. For example, the expert system 700 can receive feedback regarding the data for modifying or validating the data (e.g., editing or validating completions). In some implementations, the expert system 700 requests at least one of an identifier or a credential of a user of the client device 704 prior to providing the data to the client device 704 and/or requesting feedback regarding the data from the expert session 708. For example, the expert system 700 can request the feedback responsive to determining that the at least one of the identifier or the credential satisfies a target value for the data. This can allow the expert system 708 to selectively identify experts to use for monitoring and validating the data.

In some implementations, the expert system 700 facilitates a communication session regarding the data, between the application session 308 and the expert session 708. For example, the expert session 700, responsive to detecting presentation of the data via the application session 308, can request feedback regarding the data (e.g., user input via the application session 308 for feedback regarding the data), and provide the feedback to the client device 704 to present via the expert session 708. The expert session 708 can receive expert feedback regarding at least one of the data or the feedback from the user to provide to the application session 308. In some implementations, the expert system 700 can facilitate any of various real-time or asynchronous messaging protocols between the application session 308 and expert session 708 regarding the data, such as any of text, speech, audio, image, and/or video communications or combinations thereof. This can allow the expert system 700 to provide a platform for a user receiving the data (e.g., customer or field technician) to receive expert feedback from a user of the client device 704 (e.g., expert technician). In some implementations, the expert system 700 stores a record of one or more messages or other communications between the sessions 308, 708 in the data repository 204 to facilitate further configuration of the machine learning models 268 based on the interactions between the users of the sessions 308, 708.

Building Data Platforms and Digital Twin Architectures

Referring further to FIGS. 1-7, various systems and methods described herein can be executed by and/or communicate with building data platforms, including data platforms of building management systems. For example, the data repository 204 can include or be coupled with one or more building data platforms, such as to ingest data from building data platforms and/or digital twins. The client device 304 can communicate with the system 200 via the building data platform, and can feedback, reports, and other data to the building data platform. In some implementations, the data repository 204 maintains building data platform-specific databases, such as to enable the system 200 to configure the machine learning models 268 on a building data platform-specific basis (or on an entity-specific basis using data from one or more building data platforms maintained by the entity).

For example, in some implementations, various data discussed herein may be stored in, retrieved from, or processed in the context of building data platforms and/or digital twins; processed at (e.g., processed using models executed at) a cloud or other off-premises computing system/device or group of systems/devices, an edge or other on-premises system/device or group of systems/devices, or a hybrid thereof in which some processing occurs off-premises and some occurs on-premises; and/or implemented using one or more gateways for communication and data management amongst various such systems/devices. In some such implementations, the building data platforms and/or digital twins may be provided within an infrastructure such as those described in U.S. patents application Ser. Nos. 17/134,661 filed Dec. 28, 2020, 18/080,360, filed Dec. 13, 2022, 17/537,046 filed Nov. 29, 2021, and 18/096,965, filed Jan. 13, 2023, and Indian patent application Ser. No. 20/234,1008712, filed Feb. 10, 2023, the disclosures of which are incorporated herein by reference in their entireties.

III. Generative AI-Based Systems and Methods for Equipment Servicing

As described above, systems and methods in accordance with the present disclosure can use machine learning models, including LLMs and other generative AI models, to ingest data regarding building management systems and equipment in various unstructured and structured formats, and generate completions and other outputs targeted to provide useful information to users. Various systems and methods described herein can use machine learning models to support applications for presenting data with high accuracy and relevance.

Figure 8:
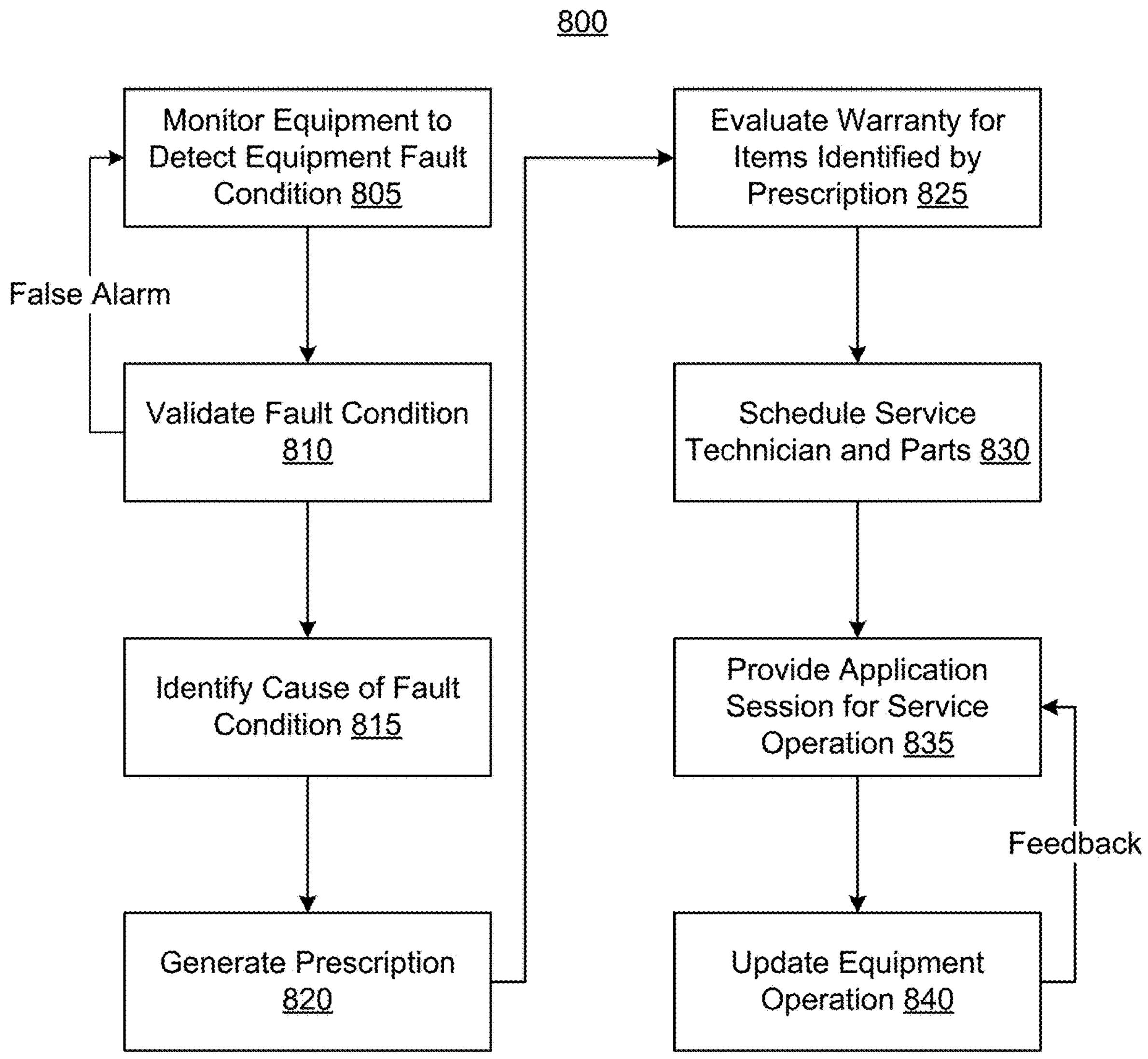
FIG. 8 is a flow diagram of a method of managing equipment servicing responsive to fault detection using machine learning models.

Equipment Service Management Responsive to Fault Detection Using Machine Learning Models FIG. 8 depicts an example of a method 800. The method 800 can be performed using various devices and systems described herein, including but not limited to the systems 100, 200 or one or more components thereof. Various aspects of the method 800 can be implemented using one or more devices or systems that are communicatively coupled with one another, including in client-server, cloud-based, or other networked architectures.

At 805, a fault condition of an item of equipment can be detected. The fault condition can be detected responsive to manual and/or automated monitoring of various data sources regarding the item of equipment. In some implementations, the fault condition is detected responsive to an alarm notification from an alarm of the equipment or coupled with the equipment. For example, sensor data of the equipment or from a sensor directed to the equipment can be monitored by the alarm, and evaluated according to one or more alarm conditions (e.g., threshold values) to trigger the alarm notification. The fault condition can be detected responsive to user input indicative of the fault condition, or images or other data received indicative of the fault condition.

At 810, the fault condition can be validated. For example, the fault condition can be validated to determine whether the alarm notification corresponds to a false alarm. In some implementations, the fault condition can be validated by verifying the data used to detect the fault condition at a second point in time (e.g., subsequent to a first point in time at which the fault condition was initially detected), such as by evaluating the one or more alarm conditions using data regarding the equipment at the second point in time; this may include using the same or different data than the data used to initially detect the fault condition to validate the fault condition. The fault condition can be validated by providing the alarm notification to a device of a user, and requesting a confirmation (or indication of false alarm) from the user via the device. Responsive to the fault condition being identified as a false alarm, the equipment can be continued to be monitored.

At 815, a cause of the fault condition can be identified, such as by performing a root cause analysis. In some implementations, the cause is detected using a function that includes one or more algorithms, tables, simulations, or machine learning models described herein. For example, at least one of an identifier of the equipment, the fault condition, user text or speech identifying the fault condition (e.g., notes from any of a variety of entities, such as a facility manager, on-site technician, etc.), or data regarding the equipment used to detect the fault condition can be applied as input to the function to enable the function to determine an indication of a cause of the fault condition. For example, the function can include a table mapping various such inputs to one or more causes of fault conditions. The function can include a machine learning model configured using various forms of data described herein. For example, the machine learning model can include one or more classifiers, language models, or combinations thereof that are trained using data that includes information indicative of fault conditions and associated causes of fault conditions.

At 820, a prescription is generated based on the cause of the fault condition. For example, one or more of the cause of the fault condition, the fault condition, and an identifier of the equipment can be provided to a language model to cause the language model to generate the prescription. The prescription can have a natural language format. The prescription can indicate one or more actions for a service technician to perform to verify, service, and/or repair the fault condition, such as instructions for tools and/or parts to use for the item of equipment. The language model can include any of various models described herein that are configured, using training data representative of prescriptions. The prescription can be generated for presentation using various output modalities, such as text, speech, audio, image, and/or video, including in real-time, conversational, or asynchronous formats.

In some implementations, generating the prescription includes conditioning or guiding the language model to generate the prescription based on a class of at least one of the service technician or the site at which the item of equipment is present. For example, the language model can have its configuration (e.g., training, etc.) modified according to labels of identifiers or classes of technicians, sites, types of equipment, or other characteristics relating to the item of equipment and/or the service technician, which can enable the prescription to be generated in a manner that is more accurate and/or relevant to the service to be performed.

At 825, a warranty is evaluated based on one or more items (e.g., the equipment, parts or tools for servicing the equipment) identified by the prescription. For example, the warranty can be retrieved from various sources, such as a contract database associated with the entity that maintains the site, according to an identifier of the type of equipment, from the service request, or various combinations thereof. The prescription (or the service request) can be parsed to identify one or more items, such as items of equipment, identified by the prescription. For example, the item of equipment for which the service request is generated can be identified from the prescription, and compared with the warranty (e.g., using natural language processing algorithms, etc.) to identify one or more warranty conditions assigned to the item of equipment. The warranty conditions can indicate, for example, timing criteria for authorizing and/or payment for servicing the item of equipment by a vendor or supplier of the item of equipment. Responsive to the warranty conditions being satisfied (e.g., a termination of the warranty not being met), various actions can be performed to trigger servicing of the item of equipment. In some implementations, one or more warranty conditions are evaluated prior to, during, and or subsequent to generation of the prescription, such as to allow the prescription to be generated to incorporate one or more outputs of the evaluation of the warranty (or avoid computational resources for generating the prescription responsive to the warranty conditions not being satisfied).

At 830, scheduling of deployment of at least one of a service technician or one or more parts identified by the prescription can be performed. In some implementations, the prescription can identify the service technician, such as to select the service technician from a plurality of candidate service technicians according to an expertise that the service technician is labeled with and which corresponds to the item of equipment. Scheduling deployment of the one or more parts can including identifying a provider of the one or more parts and assigning the one or more parts to a vehicle (e.g., trucks) for delivering the one or more parts to the site of the item of equipment. By using the language model to generate the prescription—which identifies the one or more parts—the one or more parts that are delivered to the site can be more accurately identified, which can reduce resource usage and/or wasted space or weight on the vehicle. In some implementations, scheduling deployment includes generating a service ticket indicative of the43ervicee to be performed, such as to identify the service technician, the parts, and/or the item of equipment.

Depending on the determined prescription, the scheduling can include automated servicing of the item of equipment, such as to provide commands to adjust parameters of the item of equipment to a controller of the item of equipment. The scheduling can include providing instructions for performing remote service, such as to provide instructions to a service technician to use on-site tools and/or parts, or manual adjustment of the item of equipment, to service the item of equipment (e.g., to avoid a truck deployment or truck roll to the site).

At 835, an application session for a service operation corresponding to the service request (and the prescription)

can be provided. In some implementations, the application session is provided via a device of the service technician. For example, the device can provide one or more credentials to access the application session (e.g., credentials that uniquely identify the service technician). The application session can present information to the service technician in any of various conversational, messaging, graphical, real-time, and/or asynchronous formats. The application session can receive one or more prompts from the device (e.g., from a user input device of the device), and provide the one or more prompts to the language model to cause the language model to provide corresponding completions responsive to the one or more prompts. For example, the device can receive text or image data (among other formats) as inputs provided by actions of the user (e.g., via an input interface of the device; by the user controlling a camera of the device), and provide the inputs as prompts to the language model. The application session can present the completions via the device to facilitate guiding the service technician through the actions to perform to service the item of equipment. In some implementations, the application session automatically (e.g., responsive to detecting a condition for escalating the guidance to a human expert) or manually (e.g., responsive to user input requesting guidance from a human expert) can establish a communication session between the device and a device of a human expert to provide further guidance to the service technician; the language model can provide various information such as the service request, prescription, and/or communications between the user and the language model via the application session to the device of the human expert, and can label various portions of the communications as potential causes of the escalation. The application session can be implemented as a virtual assistant, such as to provide information such as instruction manuals or technical reports regarding the item of equipment, responsive to requests from the service technician inputted at the device of the service technician.

At 840, operation of the item of equipment can be updated responsive to one or more actions performed by the service technician. For example, various parameters of operation of the item of equipment, such as setpoints, can be updated according to the one or more actions.

In some implementations, information from the service request, prescription, and application session processes can be used to perform analytics regarding entities that maintain sites and items of equipment (e.g., to evaluate customer churn). For example, information including unstructured data (e.g., service reports) regarding items of equipment and entity engagement or disengagement (e.g., deals) can be correlated to identify patterns regarding ways that service can be performed to maintain or increase the likelihood of increasing performance of one or more items of equipment of the entity, completion of deals or of maintaining engagement with the entity.

IV. Building Copilot

Figure 9:
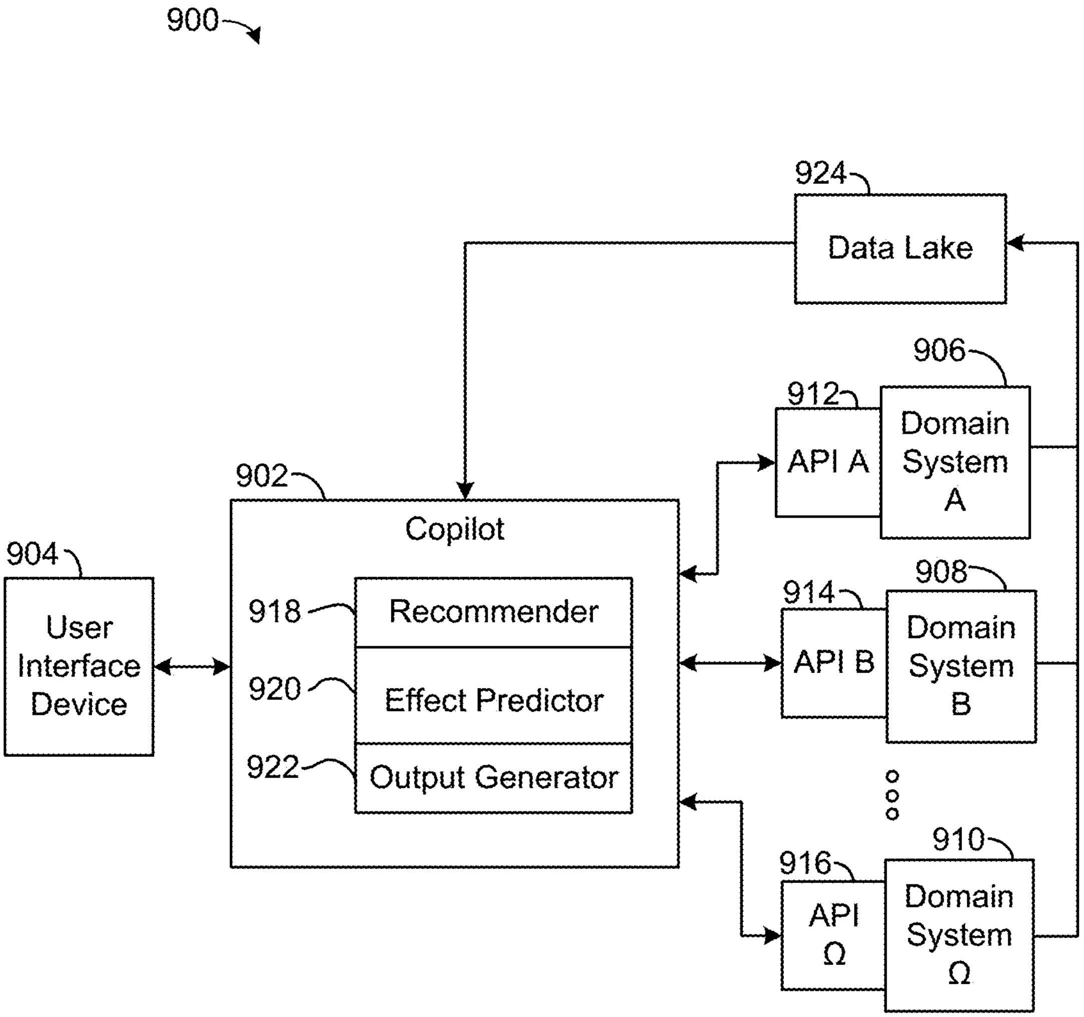
FIG. 9 is a block diagram of a system including a copilot interoperating with multiple domain systems.
Figure 10:
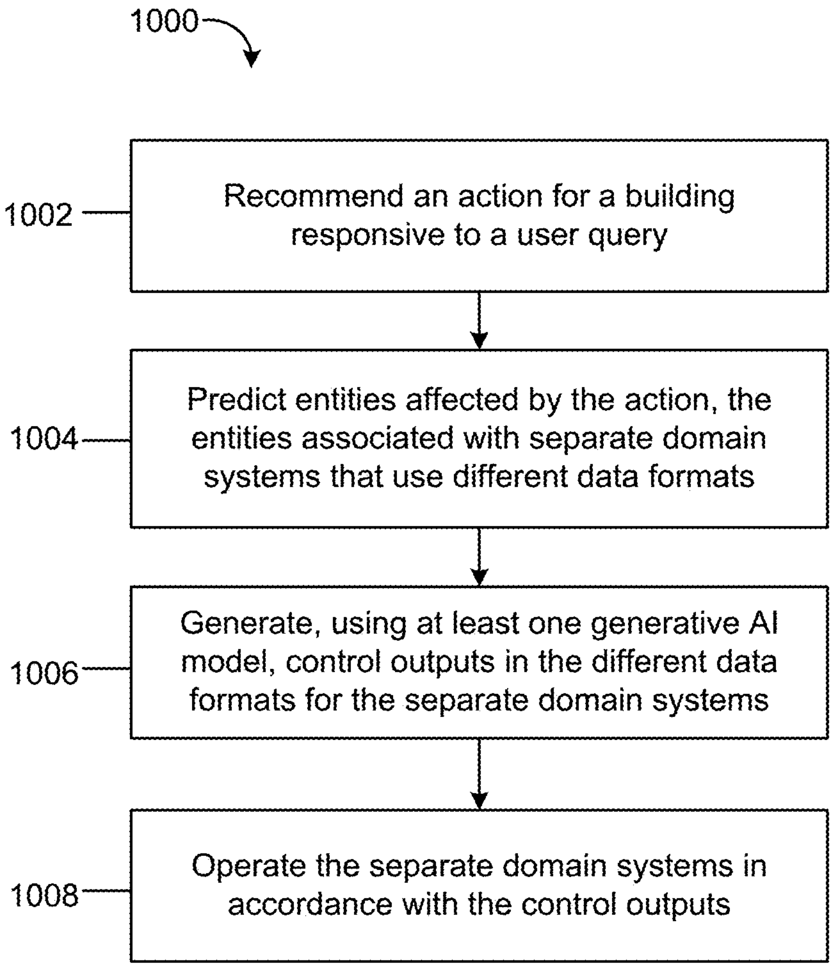
FIG. 10 is a flow diagram of a method of coordinating operation of multiple domain systems in response to user queries.

Referring now to FIGS. 9-10, a system and a method for providing a building copilot that uses at least one AI model (e.g., generative AI model) to coordinate operations of multiple building domain systems based on conversational input from a user are shown, according to various embodiments. The teachings of FIGS. 9-10 can be implemented using the models, architectures, training, generative artificial intelligence, etc. described above. While various embodiments disclosed herein discuss utilizing a generative AI model, it should be understood that, in various embodiments, the some or all of the models utilized may be non-generative AI models, such as, but not limited to, non-generative neural networks/deep neural networks.

FIG. 9 shows a system 900. The system 900 includes copilot 902, which can be include or be implanted as part of system 100, for example via model 116 and copilot application 120, a user interface device 904 (e.g., client device 304) communicable with the copilot 902, multiple domain systems serving a building (or campus, facility, etc.) (shown as domain system A 906, domain system B 908, through domain system Ω 910. Domain system A 906 interoperates tieh the copilot 902 via an application programming interface (API) shown as API A 912, while domain system B 908 interoperates with the copilot 902 via API B 914, etc., through domain system Ω 910 interoperating with the copilot 902 via API Ω 916. Data relating to operation of the domain systems 906-910 is provided to a data lake 924 (e.g., for inclusion as one or more data sources 112 as in FIG. 1) included in the system 900 and provided data as feedback for use by the copilot 902 for online usage and for reinforcement learning and/or other self-improvement over time.

The copilot 902 can be implemented using one or more non-transitory computer-readable media and one or more processors configured to execute instructions stored by the one or more non-transitory computer-readable media includes at least one generative AI model for use in performing the operations attributed thereto herein. In some embodiments, the copilot 902 is implemented using the system 100, system 200, and/or elements thereof described above. As show in FIG. 9, the copilot 902 includes a recommender 918, effect predictor 920, and output generator 922 which can be implemented using at least one AI model (e.g., separate model(s) for each of the recommender 918, effect predictor 920, and output generator 922, a unified model or set of models that integrally provides the recommender 918, effect predictor 920, and output generator 922, etc.). One or more generative AI models according to the teachings herein can be used to provide the operations of the recommender 918, the effect predictor 920, and the output generator 922. In some embodiments, a large language model is augmented with additional models, pre-processing algorithms, post-processing algorithms, feature generation algorithms, etc. in order to provide an augmented model tuned to provide the features of the copilot 902 described herein.

The recommender 918 is configured to provide, via the user interface device 904, a conversational interface in which a user query (request, question, prompt, etc.) is received via the user interface device 904 and the recommender 918 provides a recommendation or other determination relating to the user query. The user query can be input in a freeform, unstructured, natural language, textual, audible, etc. format in various embodiments, with the recommender 918 using artificial intelligence techniques as described above to process the user query and provide conversational prompts requesting that the user clarify the query, provide additional details, provide feedback, etc. The user query can be a request for a recommendation or other action to be taken at a building (e.g., "How can I reduce energy consumption?"; "People are cold in conference room B, please fix"; "What maintenance is recommended for my chiller?"; "What should we do to prepare for an important meeting next week?"; "Please provide actions for preparing an operating room for a patient's surgery"; etc.), with a large variety of requests relating to operation of building equipment and/or to particular uses, purposes, goals, etc. for a building can be received as user queries by the recommender 918.

The recommender 918 can use at least one AI model (e.g., generative AI model) to generate an action to be taken responsive to the user query (e.g., a change in settings to reduce energy consumption, a particular maintenance task to perform, a control decision to prepare a space for an event, a message to be provided to occupants, etc.). The recommendation can be based on data from one or more domain systems 906-910, for example data relating to operating status, settings, schedules, etc.; operating data of equipment; fault information or performance metrics output by domain systems; etc., in various embodiments, such that the recommender 918 uses live information relating to a particular building in addition to general learning by the at least one AI model relating to user queries and suitable recommendations. In some embodiments, the recommender 918 makes a service recommendation using the method 800 or steps thereof as in FIG. 8, for example. The recommender 918 recommends at least one action to be taken responsive to the user query.

The effect predictor 920 is configured to generative effects of the recommended action from the recommender 918 on the multiple domain systems 906-910. For example, the action may directly involve one of the domain systems (e.g., a work order system of equipment maintenance system), while the effector predictor 920 can generate an indication of effects on other domain systems (e.g., an HVAC system, an access control system, a room reservation system) that may be indirectly affected by the action (e.g., conducting equipment maintenance can involve providing a technician with access to a space, HVAC equipment may be maintained as part of the maintenance action and/or may need to operate to enable the maintenance or compensate for equipment being offline during maintenance, a room reserved for occupant use may become uncomfortable while maintenance is performed or may be needed by the technician, etc.). The effect predictor 920 can use generative artificial intelligence according to the teachings above to predict (e.g., generate) a list of other domain systems that will be affected by the recommended action and identify such effects, consequences, etc. of the recommended action.

The output generator 922 is configured generate, using at least one generative AI model, control outputs (control signals, prompts, instructions, control logic, computer code, etc.) for the multiple domain systems for implementing the recommended action and for proactively accounting for the effects of the recommended action determined by operation of the recommender 918 and the effect predictor 920. The output generator 922 can use different templates, data formats, communication protocols, etc. for each domain system 906-910, for example as required for interoperation via the different APIs 912-916. In some embodiments, the output generator 922 outputs control setpoints, settings, etc. to be consumed as inputs by one or more domain systems 906-910. In some embodiments, the output generator 922 generates control logic (e.g., computer code, programming) which can be installed into one or more domain systems 906-910 via APIs 912-916 to program the one or more domain systems 906-910 to execute the control logic during runtime, thereby providing the one or more domain systems 906-910 with a behavior (control mode, operational logic, etc.) generated by the copilot 902. The output generator 922 thereby uses the generative AI techniques discussed above to generate control outputs in multiple different formats suitable for the causing the multiple domain systems to act in an coordinated manner to implement the recommended action and account for effects of the recommend action on other building domain systems. The output generator 922 thereby uses generative AI to solve a technical challenge inherent in combinations of multiple building domain systems that serve buildings, in particular that different domains, different manufacturers, different vendors, etc. often use substantially-different data formats, communication protocols, etc. which creates a barrier to integration and coordination. The control outputs are then provided from the copilot 902 to the multiple domain systems 906-910 via APIs 912-916 as shown in FIG. 9.

In the example of FIG. 9, for example, a user may provide a query relating directly to operation of domain system A 906 via the user interface device 904. The recommender 918 can use at least one generative AI model to determine an action to be taken in domain system A 906 to address the user's query. The effect predictor 920 can then use the at least one generative AI model to predict that the domain system B 908 and the domain system 910 will be impacted by the action to be taken in domain system A 906 and/or otherwise indirectly, tangentially, or also are involved in fully responding to the user query. The output generator 922 can then use the at least one generative AI model to generate a first control output for domain system A 906 in a first data format compatible with API A 912, a second control output for domain system B 908 in a second data format compatible with API B 914, and a third control output for domain system Ω in a third data format compatible with API Ω 916. The user can thus provide freeform input, for example relating to a particularized question, request, command, etc. and the copilot 902 can generate commands compatible with multiple relevant domain systems while hiding the internal complexity, different data formats, etc. from the user and providing the user a single interface for interacting with multiple domain systems.

As illustrated in FIG. 9, the copilot 902 serves, in some respects, as a streamlined, intelligent, unified building management system. The architecture illustrated in FIG. 9 can eliminated various integration engines, separate user interfaces and devices, supervisory devices and management hardware, etc. as compared to conventional building management systems. The copilot 902 can be provided to intelligently coordinate between the domain systems 906-910 without requiring, in some embodiments, preset computer code providing discrete logic for coordination and integration. Instead, by use of at least one generative AI model as described above, the copilot 902 can be automatically adaptive to learning, from the data lake 924, interrelationships between domain systems 906-910 and desired user interoperation of domain systems 906-910 to provide an easily-deployable, flexible, scalable, seamless (from a user's perspective) copilot 902 to assist users (e.g., occupants, building managers, etc.) in achieving desired building outcomes (e.g., behaviors, conditions, consumption goals, emissions targets, etc.) without requiring such users to reach separately into multiple domain systems.

Referring now to FIG. 10, a flowchart of a method 1000 is shown, according to some embodiments. The method 1000 can be executed by the copilot 902, the system 100, the system 200, etc. in various embodiments. Various aspects of the method 800 can be implemented using one or more devices or systems that are communicatively coupled with one another, including in client-server, cloud-based, or other networked architectures.

At step 1002, an action is recommended for a building responsive to a user query 1002. The user query 102 may be provided as a freeform textual or audio input. In some embodiments, step 1002 includes providing a chatbot interaction between copilot 902 or other system or device and a user, for example where copilot 902 asks clarifying questions and/or otherwise prompts the user to provide sufficient information to fully define the user's query (e.g., to confirm which space of a building the user referred to, to determine characteristics of an event or goal the user asked about, to ask whether a query about a first domain should also be responded to with actions in a second domain, etc.). The action can be an action to be implemented in one or more domain systems. Step 1002 can be executed using at least one generative AI model, for example as described above with reference to the recommender 918.

At step 1004, entities affected by or capable of implementing the action are predicted, for example using the at least one generative AI model. The entities can be equipment units, building spaces, occupants, tasks (e.g., meetings, room reservations, patient treatments, maintenance actions) and can be associated with multiple different, separate domain systems. Domain systems affected by the action are thereby determined. Step 1004 can be performed according to the teachings descried above with reference to the effect predictor 920, for example using data from multiple domain systems which is stored together in the data lake 924 such that interrelationships between the domain systems and influences of the domain systems on each other, on the building, on occupants, etc. can be leveraged in step 1004 by the at least one generative AI model. In step 1004, at least one generative AI model can be used to generate an indication (e.g., list, vector, etc.) of entities or domain systems predicted to be impacted by the action, or capable of implementing an action, for example including an indication of the predicted impacts, in some embodiments.

At step 1006, control outputs are generated for the different domain systems, including a domain system in which the action is to be executed and any domain systems identified in step 1004. At least one generative AI model can be used in step 1006 to generate the control outputs using templates associated with the different domain systems such that each control output is generated in the data format compatible with the corresponding domain system. The control outputs can be configured to cause the domain systems to take actions to compensate for, prepare for, account for, adapt relative to, facilitate, provide, etc. any effects predicted in step 1004 and/or the action recommended in step 1002. Step 1006 can be provided using the teachings disclosed above with reference to the output generator 922. By generating such multiple control outputs in multiple data formats by at least one generative AI model step 1006, the method 1000 coordinates the multiple domain systems without requiring the user to interact directly with the multiple different domain systems, have knowledge of different APIs in use, provide inputs in formats suitable for the different domain systems, or otherwise dedicate attention to the different domain systems. The user is instead provided with a copilot which generates such domain-specific control outputs based on a unified conversational input provided in step 1002.

At step 1008, the separate domain systems are operated in accordance with the control outputs. Step 1008 can include distributing the control outputs to the corresponding domain systems via one or more networks (e.g., multiple networks using multiple communication protocols and channels such as WiFi, Internet, Bluetooth, BACnet, Modbus, LonWorks, etc.) and operating, by the separate domain systems, in accordance with such outputs. Accordingly, step 1008 can include providing the plurality of control outputs in the plurality of different data formats to the plurality of separate domain systems. Operating each domain system can include various different tangible operations depending on the equipment of the relevant domain system, for example operating to heat or cool a building by an HVAC system, operating to light a building by a lighting system, operating to provide fire alerting by a fire protection system, operating to allow or deny a person access to a space by an access control system, operating to change a room reservation and provide updates to occupants by a room reservation system, generating a work order and implementing maintenance by a maintenance system, etc., in various embodiments.

To provide a non-limiting example of method 1000, in some scenarios the user query processed in step 1002 relates to performance of a unit of HVAC equipment (e.g., "How can we improve efficiency of our rooftop unit?") and the action recommending in step 1002 is a maintenance task for the unit of HVAC equipment (e.g., replacing a part of the rooftop unit). Step 1004 can then predict that a space served by the unit of HVAC equipment will be impacted during maintenance (e.g., not heated/cooled while the equipment is offline being serviced) and that other HVAC devices may need to operate differently to compensate for the particular unit being offline during maintenance and/or performing differently after the maintenance task is completed. In such a scenario, the control outputs generated in step 1006 can include an instruction for a work order to be generated by a work order system of the multiple domain system, a prompt to a room reservation system of the plurality of domain systems that causes the room reservation system to change reservations for a space to be affected by performance of the maintenance task (e.g., so that a meeting is moved to a different space that will have operational HVAC equipment while the maintenance is being performed on the unit of HVAC equipment), and a control decision for an HVAC system of the multiple domain systems. The control decision for the HVAC system may be configured to prepare the unit of HVAC equipment for maintenance or to cause the HVAC system to compensate for effects of the performance of the maintenance task on building conditions, energy consumption, or the like. Various other control outputs can be generated in step 1006 in such scenarios, for example commands to an access control system providing a technician with the ability to access the equipment for service, commands to a parking system providing the technician with the access to a parking lot during a time period around the service, commands to a lighting system so that a space is lit for the technician to work, etc., in various embodiments.

To provide another non-limiting example of method 1000, in some scenarios the user query relates to an incoming patient to a hospital (e.g., a query from a user to the copilot to prepare one for treatment of the patient). The recommended action generated in step 1002 can be an action to ready a particular operating room for patient treatment. In such a scenario, the control outputs generated in step 1006 can include a control signal for an HVAC system of the multiple domain of domain systems to cause the HVAC system to place the room in compliance with temperature, humidity, and pressure requirements for patient treatment, a prompt to a room reservation system of the plurality of domain systems causing the room reservation to mark the room as in-use for the patient treatment, and an instruction to at a healthcare system of the plurality of domain systems. The instructions to the healthcare system can cause the healthcare system to perform one or more of notifying a healthcare provider of the room for the patient treatment, initiating operation of a medical device for use in the patient treatment, or updating an electronic medical record for the patient. The method 1000 can thereby provide holistic building and operations management for a healthcare facility.

Many additional example scenarios are contemplated by and can be handled by the teachings herein, for example relating to applications in office buildings, classroom buildings, manufacturing facilities, stadiums, healthcare facilities, residential properties, retail facilities, restaurants and kitchen facilities, waste management facilities, etc. A flexible, scalable, tunable system is thereby provided by the teachings herein.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method of operating a building served by a plurality of separate domain systems, comprising:
- recommending, by one or more processors, an action for the building responsive to a user query;
- predicting, by the one or more processors, a plurality of entities affected by the action, the plurality of entities associated with the plurality of separate domain systems, wherein the plurality of separate domain systems use a plurality of different data formats;
- generating, by the one or more processors using at least one generative AI model, a plurality of control outputs in the plurality of different data formats; and
- affecting operations of the plurality of separate domain systems by providing the plurality of control outputs in the plurality of different data formats to the plurality of separate domain systems.

2. The method of claim 1, wherein the user query is provided as a freeform textual or audio input.

3. The method of claim 1, wherein the plurality of separate domain systems comprise two or more of an HVAC system, a work order system, a room reservation system, an access control system, a security system, a fire system, a medical device system, an energy system, a building management system, a lighting system, an elevator system, a manufacturing system, an inventory system, and a parking system.

4. The method of claim 1, further comprising augmenting the at least one generative AI model using training data relating to the plurality of separate domain systems.

5. The method of claim 1, wherein predicting the plurality of entities affected by the action comprises generating an indication of the plurality of entities using the at least one generative AI model.

6. The method of claim 1, wherein:

the user query relates to performance of a unit of HVAC equipment;

the action comprises a maintenance task for the unit of HVAC equipment; and the plurality of control outputs comprise:

an instruction for a work order to be generated by a work order system of the plurality of domain system;

a prompt to a room reservation system of the plurality of domain systems, the prompt causing the room reservation system to change reservations for a space to be affected by performance of the maintenance task; and a control decision for an HVAC system of the plurality of domain systems, the control decision configured to prepare the unit of HVAC equipment for maintenance or to cause the HVAC system to compensate for effects of the performance of the maintenance task on building conditions.

7. The method of claim 1, wherein:

the user query relates to an incoming patient to a hospital;

the action comprises readying a room for patient treatment; and the plurality of control outputs comprise:

a control signal for an HVAC system of the plurality of domain systems, the controls signals causing the HVAC system to place the room in compliance with temperature, humidity, and pressure requirements for patient treatment;

a prompt to a room reservation system of the plurality of domain systems, the prompt causing the room reservation to mark the room as in-use for the patient treatment; and an instruction to at a healthcare system of the plurality of domain systems, the instructions causing the healthcare system to perform one or more of notifying a healthcare provider of the room for the patient treatment, initiating operation of a medical device for use in the patient treatment, or updating an electronic medical record for the patient.

8. The method of claim 1, wherein the plurality of control outputs comprise computer code providing control logic to be executed by one of the plurality of domain systems.

9. The method of claim 1, further comprising prompting the user for clarification of the user query via a chatbot interaction.

10. A system for a building having a plurality of separate domain systems serving the building and using a plurality of different data formats, the system comprising:

a computer comprising at least one processor and programming causing the at least one processor to perform operations comprising:

recommending an action for the building responsive to a user query;

predicting a plurality of entities affected by the action, the plurality of entities associated with the plurality of separate domain systems;

generating, using at least one generative AI model, a plurality of control outputs in the plurality of different data formats;

affecting operations of the plurality of separate domain systems by providing the plurality of control outputs in the plurality of different data formats to the plurality of separate domain systems.

11. The system of claim 10, wherein the computer is programmed to receive the user query as freeform textual or audio input.

12. The system of claim 10, wherein the plurality of separate domain systems comprise three or more of an HVAC system, a work order system, a room reservation system, an access control system, a security system, a fire system, a medical device system, an energy system, a building management system, a lighting system, an elevator system, a manufacturing system, an inventory system, and a parking system.

13. The system of claim 10, wherein the operations further comprise augmenting the at least one generative AI model using training data relating to the plurality of separate domain systems.

14. The system of claim 10, wherein predicting the plurality of entities affected by the action comprises generating an indication of the plurality of entities using the at least one generative AI model.

15. The system of claim 10, wherein:

the user query relates to performance of a unit of HVAC equipment;

the action comprises a maintenance task for the unit of HVAC equipment; and the plurality of control outputs comprise:

an instruction for a work order to be generated by a work order system of the plurality of domain system;

a prompt to a room reservation system of the plurality of domain systems, the prompt causing the room reservation system to change reservations for a space to be affected by performance of the maintenance task; and a control decision for an HVAC system of the plurality of domain systems, the control decision configured to prepare the unit of HVAC equipment for maintenance or to cause the HVAC system to compensate for effects of the performance of the maintenance task on building conditions.

16. The system of claim 10, wherein:

the user query relates to an incoming patient to a hospital;

the action comprises readying a room for patient treatment; and the plurality of control outputs comprise:

a control signal for an HVAC system of the plurality of domain systems, the controls signals causing the HVAC system to place the room in compliance with temperature, humidity, and pressure requirements for patient treatment;

a prompt to a room reservation system of the plurality of domain systems, the prompt causing the room reservation to mark the room as in-use for the patient treatment; and an instruction to at a healthcare system of the plurality of domain systems, the instructions causing the healthcare system to perform one or more of notifying a healthcare provider of the room for the patient treatment, initiating operation of a medical device for use in the patient treatment, or updating an electronic medical record for the patient.

17. The system of claim 10, wherein the plurality of control outputs comprise computer code providing control logic to a first domain system of the plurality of domain systems such that the first domain system executes the computer code to provide the control logic.

18. One or more non-transitory computer-readable medium storing program instructions that, when executed by at least one processor, cause the one or more processors to perform operations comprising:

recommending an action for the building responsive to a user query;

predicting a plurality of entities affected by the action, the plurality of entities associated with the plurality of separate domain systems, wherein the plurality of separate domain systems use a plurality of different data formats;

generating, using at least one generative AI model, a plurality of control outputs in the plurality of different data formats; and affecting operations of the plurality of separate domain systems by providing the plurality of control outputs in the plurality of different data formats to the plurality of separate domain systems.

19. The one or more non-transitory computer-readable media of claim 18, wherein:

the user query relates to performance of a unit of HVAC equipment;

the action comprises a maintenance task for the unit of HVAC equipment; and the plurality of control outputs comprise:

an instruction for a work order to be generated by a work order system of the plurality of domain system;

a prompt to a room reservation system of the plurality of domain systems, the prompt causing the room reservation system to change reservations for a space to be affected by performance of the maintenance task; and a control decision for an HVAC system of the plurality of domain systems, the control decision configured to prepare the unit of HVAC equipment for maintenance or to cause the HVAC system to compensate for effects of the performance of the maintenance task on building conditions.

20. The one or more non-transitory computer-readable media of claim 18, wherein:

the user query relates to an incoming patient to a hospital;

the action comprises readying a room for patient treatment; and the plurality of control outputs comprise:

a control signal for an HVAC system of the plurality of domain systems, the controls signals causing the HVAC system to place the room in compliance with temperature, humidity, and pressure requirements for patient treatment;

a prompt to a room reservation system of the plurality of domain systems, the prompt causing the room reservation to mark the room as in-use for the patient treatment; and an instruction to at a healthcare system of the plurality of domain systems, the instructions causing the healthcare system to perform one or more of notifying a healthcare provider of the room for the patient treatment, initiating operation of a medical device for use in the patient treatment, or updating an electronic medical record for the patient.

* * * * *